United States Patent
van Wyk et al.

(10) Patent No.: US 12,545,916 B2
(45) Date of Patent: Feb. 10, 2026

(54) ALLELE-SPECIFIC SILENCING THERAPY FOR DFNA9 USING ANTISENSE OLIGONUCLEOTIDES

(71) Applicant: Stichting Radboud universitair medisch centrum, Nijmegen (NL)

(72) Inventors: Erwin van Wyk, Nijmegen (NL); Erik de Vrieze, Nijmegen (NL)

(73) Assignee: Stiching Radboud universitair medisch centrum, Nijmegen (NL)

( * ) Notice: Subject to any disclaimer, the term of this patent is extended or adjusted under 35 U.S.C. 154(b) by 955 days.

(21) Appl. No.: 17/772,549

(22) PCT Filed: Oct. 29, 2020

(86) PCT No.: PCT/EP2020/080429
§ 371 (c)(1),
(2) Date: Apr. 28, 2022

(87) PCT Pub. No.: WO2021/084021
PCT Pub. Date: May 6, 2021

(65) Prior Publication Data
US 2022/0389432 A1    Dec. 8, 2022

(30) Foreign Application Priority Data

Oct. 31, 2019   (EP) .................................... 19206490

(51) Int. Cl.
| | | |
|---|---|---|
| *C12N 15/113* | (2010.01) | |
| *A61K 9/00* | (2006.01) | |
| *A61K 31/711* | (2006.01) | |
| *A61P 27/16* | (2006.01) | |
| *A61P 43/00* | (2006.01) | |
| *C12Q 1/68* | (2018.01) | |

(52) U.S. Cl.
CPC ........ *C12N 15/1138* (2013.01); *A61K 9/0046* (2013.01); *A61K 31/711* (2013.01); *A61P 27/16* (2018.01); *A61P 43/00* (2018.01); *C12N 2310/11* (2013.01); *C12N 2310/313* (2013.01); *C12N 2310/321* (2013.01); *C12N 2320/34* (2013.01)

(58) Field of Classification Search
None
See application file for complete search history.

(56) References Cited

FOREIGN PATENT DOCUMENTS

| WO | WO00/18211 A2 | 4/2000 |
| WO | WO00/71081 A2 | 11/2000 |
| WO | WO2019/028246 A2 | 2/2019 |

OTHER PUBLICATIONS

Manik Goel et al: "Cochlin, Intraocular Pressure Regulation and Mechanosensing", PLOS ONE, vol. 7, No. 4, Apr. 4, 2012, p. e34309, DOI : 10. 1371/journal .pone. 0034309 pp. 2,8.

Shibata Seiji B et al: "RNA Interference Prevents Autosomal-Dominant Hearing Loss", American Journal of Human Genetics, American Society of Human Genetics, vol. 98, No. 6, May 26, 2016, pp. 1101-1113, DOI: 10.1016/J.AJHG.2016.03.028.

Jianping Zhang et al: "BMP Induces Cochlin Expression to Facilitate Self-renewal and Suppress Neural Differentiation of Mouse Embryonic Stem Cel ls", Journal of Biological Chemistry, vol. 288, No. 12, Mar. 22, 2013, pp. 8053-8060, DOI: 10. 1074/jbc.M112. 433995 p. 8054-p. 8059.

Masuda Masatsugu et al: A novel frameshift variant of COCHsupports the hypothesis that haploinsufficiency is not a cause of autosomal dominant nonsyndromic deafness 9'* Biochemical and Biophysical Research Communications, vol. 469, No. 2, Nov. 26, 2015, pp. 270-274, DOI: 10. 1016/J.BBRC.2015. 11. 106.

Crosby JR, Zhao C, Jiang C, Bai D, Katz M, Greenlee S, et al. Inhaled ENaC antisense oligonucleotide ameliorates cystic fibrosis-like lung disease in mice. J. Cyst. Fibros. Nov. 2017;16(6):671-80.

De Kok YJ, Bom SJ, Brunt TM, Kemperman MH, van Beusekom E, van der Velde-Visser SD, et al. A Pro51Ser mutation in the COCH gene is associated with late onset autosomal dominant progressive sensorineural hearing loss with vestibular defects. Hum Mol Genet. Feb. 1999;8(2):361-6.

Gallant E, Francey L, Fetting H, Kaur M, Hakonarson H, Clark D, et al. Novel COCH mutation in a family with autosomal dominant late onset sensorineural hearing impairment and tinnitus. Am J Otolaryngol. May 2013;34(3):230-5.

Ikezono T, Omori A, Ichinose S, Pawankar R, Watanabe A, Yagi T. Identification of the protein product of the Coch gene (hereditary deafness gene) as the major component of bovine inner ear protein. Biochim Biophys Acta. Mar. 26, 2001;1535(3):258-65.

JanssensdeVarebeke SPF, Van Camp G, Peeters N, Elinck E, Widdershoven J, Cox T, et al. Bi-allelic inactivating variants in the COCH gene cause autosomal recessive prelingual hearing impairment. Eur. J. Hum. Genet. Nature Publishing Group; Feb. 15, 2018;23:42. PMCID: PMC5891501.

Jones SM, Robertson NG, Given S, Giersch ABS, Liberman MC, Morton CC. Hearing and vestibular deficits in the Coch(-/-) null mouse model: comparison to the Coch(G88E/G88E) mouse and to DFNA9 hearing and balance disorder. Hear. Res. Feb. 2011;272(1-2):42-8. PMCID: PMC3039082.

Jung J, Yoo JE, Choe YH, Park SC, Lee HJ, Lee HJ, et al. Cleaved Cochlin Sequesters Pseudomonas aeruginosa and Activates Innate Immunity in the Inner Ear. Cell Host & Microbe. Cell Press; Apr. 10, 2019;25(4):513-6.

Kommareddi PK, Nair TS, Raphael Y, Telian SA, Kim AH, Arts HA, et al. Cochlin isoforms and their interaction with CTL2 (SLC44A2) in the inner ear. J. Assoc. Res. Otolaryngol. Dec. 2007;8(4):435-46. PMCID: PMC2538338.

Kordasiewicz HB, Stanek LM, Wancewicz EV, Mazur C, McAlonis MM, Pytel KA, et al. Sustained therapeutic reversal of Huntington's disease by transient repression of huntingtin synthesis. Neuron. Jun. 21, 2012;74(6):1031-44. PMCID: PMC3383626.

(Continued)

*Primary Examiner* — Sean Mcgarry
(74) *Attorney, Agent, or Firm* — Ipsilon USA—NLO

(57) ABSTRACT

The invention relates to the fields of medicine and immunology. In particular, it relates to novel antisense oligonucleotides that may be used in the treatment, prevention and/or delay of an COCH associated condition.

12 Claims, 6 Drawing Sheets

Specification includes a Sequence Listing.

(56) References Cited

OTHER PUBLICATIONS

Liang X-H, Sun H, Nichols JG, Crooke ST. RNase H1-Dependent Antisense Oligonucleotides Are Robustly Active in Directing RNA Cleavage in Both the Cytoplasm and the Nucleus. Sep. 6, 2017;25(9):2075-92. Retrieved from: http://linkinghub.elsevier.com/retrieve/pii/S1525001617302629.

Nagy I, Trexler M, Patthy L. The second von Willebrand type A domain of cochlin has high affinity for type I, type II and type IV collagens. Febs Lett. John Wiley & Sons, Ltd; Dec. 10, 2008;582(29):4003-7.

Robertson NG, Cremers CWRJ, Huygen PLM, Ikezono T, Krastins B, Kremer H, et al. Cochlin immunostaining of inner ear pathologic deposits and proteomic analysis in DFNA9 deafness and vestibular dysfunction. Hum Mol Genet. Apr. 1, 2006;15(7):1071-85.

Robertson NG, Jones SM, Sivakumaran TA, Giersch ABS, Jurado SA, Call LM, et al. A targeted Coch missense mutation: a knock-in mouse model for DFNA9 late-onset hearing loss and vestibular dysfunction. Hum Mol Genet. Oxford University Press; Nov. 1, 2008;17(21):3426-34. PMCID: PMC2566528.

Robertson NG, Lu L, Heller S, Merchant SN, Eavey RD, McKenna M, et al. Mutations in a novel cochlear gene cause DFNA9, a human nonsyndromic deafness with vestibular dysfunction. Nat. Genet. Nov. 1998;20(3):299-303.

Vickers TA, Crooke ST. Antisense Oligonucleotides Capable of Promoting Specific Target mRNA Reduction via Competing RNase H1-Dependent and Independent Mechanisms. Buratti E, editor. PLoS One. Oct. 9, 2014;9(10):e108625.

Wang L, Kempton JB, Brigande JV. Gene Therapy in Mouse Models of Deafness and Balance Dysfunction. Front Mol Neurosci. 2018;11:300. PMCID: PMC6123355.

Yao J, Py BF, Zhu H, Bao J, Yuan J. Role of protein misfolding in DFNA9 hearing loss. Journal of Biological Chemistry. American Society for Biochemistry and Molecular Biology; May 14, 2010;285(20):14909-19. PMCID: PMC2865277.

Roosing, S., Lamers, I. J. C., de Vrieze, E., van den Born, L. I., Lambertus, S., Arts, H. H., et al. Disruption of the basal body protein POC1B results in autosomal-recessive cone-rod dystrophy. American Journal of Human Genetics; 2014, 95(2), 131-142. PMCID: PMC4129401.

Bom SJH, Kemperman MH, Huygen PLM, Luijendijk MWJ, Cremers CWRJ. Cross-sectional analysis of hearing threshold in relation to age in a large family with cochleovestibular impairment thoroughly genotyped for DFNA9/COCH. Ann. Otol. Rhinol. Laryngol. Mar. 2003;112(3):280-6.

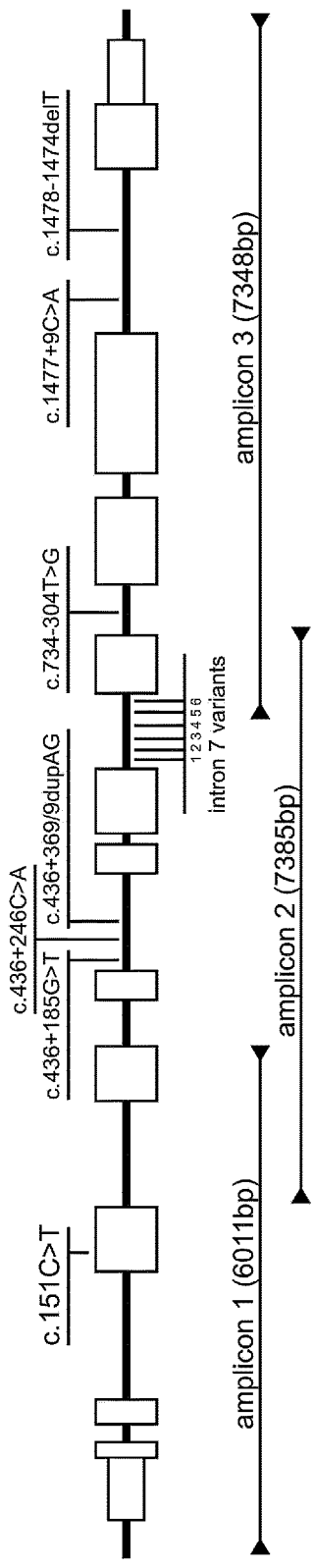
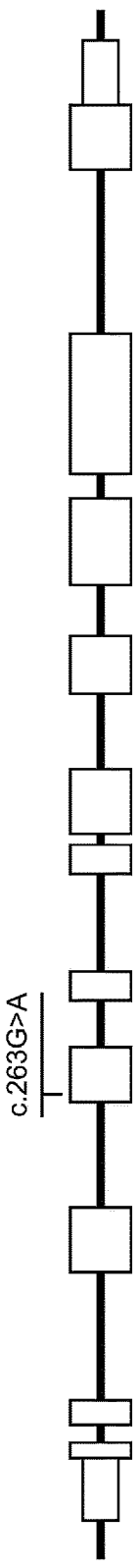
Fig. 1A
Fig. 1B

ALLELE-SPECIFIC SILENCING THERAPY FOR DFNA9 USING ANTISENSE OLIGONUCLEOTIDES

FIELD OF THE INVENTION

The invention relates to the fields of medicine and immunology. In particular, it relates to novel antisense oligonucleotides that may be used in the treatment, prevention and/or delay of conditions associated with genetic variants in COCH.

BACKGROUND OF THE INVENTION

DFNA9, caused by mutations in the COCH gene, is a relatively common form of dominantly inherited progressive hearing loss and vestibular dysfunction. It is characterized by late-onset hearing loss, leading to complete deafness by the age of 50-70 (Born et al., 2003; Robertson et al., 2006). With progression of the disease, speech perception and conversation become severely limited. DFNA9 patients furthermore suffer from balance problems, severely hampering their daily movements. Together, this negatively impacts the quality of life of patients and their friends and family members.

The COCH gene is located on chromosome 14 (chr14: 31,343,720-31,364,271 [GRCh37/hg19], NCBI reference sequence NG_008211.2), and encodes for cochlin, a protein that consists of 550 amino acids. Cochlin contains a signal peptide, an LCCL (Limulus factor C, Cochlin, and late gestation lung protein LgI1) domain, two short intervening domains, and two vWFA (von Willebrandfactor A) domains. Cochlin is expressed in the fibrocytes of the spiral ligament and spiral limbus, where it has been reported to assist in structural support, sound processing and maintenance of balance within the inner ear (Gallant et al., 2013). Proteolytic cleavage of cochlin, between the LCCL domain and the downstream vWFA domains, gives rise to a secreted 16-kDa LCCL domain-containing peptide that was shown to play a role in innate immunity in the cochlea (Jung et al., 2019). Cochlin, and particularly the vWFA domain-containing peptides, are a major component of the cochlear extracellular matrix (Ikezono et al., 2001; Kommareddi et al., 2007; Nagy et al., 2008).

The LCCL domain harbors two founder mutations: c.151C>T (p.P51S) in the Dutch/Belgian population, and c.263G>A (p.G88E) in the American population (Robertson et al., 1998; de Kok et al., 1999). Overexpression of cochlin proteins containing these variants in cultured cells revealed that both mutations resulted in the formation of cytotoxic cochlin dimers (Yao et al., 2010). And although both mutations did not affect secretion of cochlin, proteolytic cleavage of cochlin was shown to be impaired by these mutations. These findings indicate that DFNA9 results from a gain-of-function and/or a dominant-negative disease mechanism, rather than from haploinsufficiency. Gene augmentation therapy, which is currently under development for several types of hereditary hearing impairment (Wang et al., 2018), would not be effective, as this does not relieve the inner ear from the formation of cytotoxic cochlin dimers and secretion of unprocessed cochlin proteins. However, prevention of mutant cochlin production has high therapeutic potential. The lack of an auditory and vestibular phenotype in mice carrying a heterozygous null mutation in Coch (Jones et al., 2011), and heterozygous family members of patients suffering from early-onset hearing impairment caused by a homozygous null mutation in COCH, illustrates that sufficient functional cochlin proteins can be produced from a single healthy COCH allele (JanssensdeVarebeke et al., 2018).

DNA-based antisense oligonucleotides containing thymine residues instead of uracil residues, have been shown to effectively target (pre)mRNA molecules for degradation by the RNase H1 enzyme (Vickers and Crooke, 2014; Liang et al., 2017). This type of antisense oligonucleotide therapy is currently under development for several types of hereditary disorders, such as Huntington's and cystic fibrosis (Kordasiewicz et al., 2012; Crosby et al., 2017). There are only few reports of therapeutic application of AONs in the inner ear, most of which focus on splice-correction therapy. The fact that a considerable amount of DFNA9 cases carry the c.151C>T or c.263G>A founder mutations renders it an attractive target for antisense oligonucleotide (AON)-based therapy. Accordingly, there is an urge to develop AONs for degradation of the mutated COCH gene to prevent the formation of cytotoxic cochlin dimers in subjects suffering from hearing impairment and/or vestibular dysfunction, and thereby delaying of halting disease progression.

SUMMARY OF THE INVENTION

The invention relates to an antisense oligonucleotide moiety for the specific degradation of a mutated COCH transcript that binds to and/or is complementary to a polynucleotide with the nucleotide sequence as set forward in SEQ ID NO: 1 or in SEQ ID NO: 2, wherein preferably the antisense oligonucleotide moiety binds to or is complementary to a polynucleotide part within SEQ ID NO: 1 or SEQ ID NO: 2, said polynucleotide part having a nucleotide sequence selected from the group consisting of SEQ ID NO: 6, 7, 8, 9, 10, 11, 12, 13, 14, 15, 16, 17, 18, 19, 20, 21, 22, 23, 24, 25, and 26.

The invention further relates to a pharmaceutical composition comprising an antisense oligonucleotide for the degradation of a mutated COCH according to the invention and further comprising a pharmaceutically acceptable excipient.

In a third aspect, the invention provides for an antisense oligonucleotide for the degradation of a mutated COCH according to the invention or the pharmaceutical composition according to the invention for use as a medicament, preferably for use as a medicament for treating a COCH related disease or a condition requiring the degradation of mutated COCH (pre)mRNA.

The invention further relates to the use of the antisense oligonucleotide for the degradation of a mutated COCH according to the invention or the pharmaceutical composition according to the invention, for treating a COCH related disease or a condition requiring the degradation of mutated COCH (pre)mRNA.

The invention further relates to a method of treatment of a COCH related disease or condition requiring the degradation of mutated COCH (pre)mRNA in a subject in need thereof, comprising administration of an antisense oligonucleotide for the degradation of a mutated COCH according to the invention or administration of the pharmaceutical composition according to the invention.

The invention further relates to a method for the degradation of a mutated COCH in a cell, the method comprising contacting the cell with an antisense oligonucleotide for the degradation of a mutated COCH according to the invention or the pharmaceutical composition according to the invention.

DETAILED DESCRIPTION OF THE INVENTION

By definition, antisense oligonucleotides (AONs) are substantially complementary (i.e. antisense) to their target, allowing them to bind to the corresponding pre-mRNA molecule. On the basis of mechanism of action, two main classes of antisense oligonucleotide can generally be discerned: (a) the RNase H-dependent oligonucleotides, which induce degradation of mRNA; and (b) the steric-blocker oligonucleotides, which physically prevent or inhibit progression of splicing or the translational machinery.

The inventors have identified AONs that allow the specific degradation of mutant COCH transcripts that are associated with DFNA9. The prerequisite for an effective AON-based therapy in the treatment of dominantly inherited non-haploinsufficiency disorder is that protein production from the healthy allele remains unaffected. The mutant and healthy cochlin-encoding sequence only differ from each other by a single nucleotide. However, the inventors identified 12 additional low-frequency variants (<0.1 allele frequency in the non-Finnish European population) that are present on the c.151C>T allele of the COCH gene (see table 3 below). These variants offer additional targets for the most optimal discrimination between the mutant and the wildtype allele in the design of a mutant allele-specific, AON-based therapy for DFNA9. No such additional genetic variants were identified for the c.263G>A mutant allele.

Accordingly, in a first aspect the invention provides for an antisense oligonucleotide moiety for the specific degradation of a mutated COCH transcript that binds to and/or is complementary to a polynucleotide with the nucleotide sequence as set forward in SEQ ID NO: 1 or in SEQ ID NO: 2. Preferably, the antisense oligonucleotide moiety binds to or is complementary to a polynucleotide part within SEQ ID NO: 1 or SEQ ID NO: 2, said polynucleotide part having a nucleotide sequence selected from the group consisting of SEQ ID NO: 6, 7, 8, 9, 10, 11, 12, 13, 14, 15, 16, 17, 18, 19, 20, 21, 22, 23, 24, 25, and 26.

The terms "antisense oligonucleotide" and "AON" are used interchangeably herein and are understood to refer to an oligonucleotide molecule comprising a nucleotide sequence which is substantially complementary to a target nucleotide sequence in a pre-mRNA molecule, hnRNA (heterogenous nuclear RNA) or mRNA molecule. The degree of complementarity (or substantial complementarity) of the antisense sequence is preferably such that a molecule comprising the antisense sequence can form a stable hybrid with the target nucleotide sequence in the RNA molecule under physiological conditions. Binding of an AON to its target can easily be assessed by the person skilled in the art using techniques that are known in the field such as the gel mobility shift assay as described in EP1619249.

The term "complementary" used in the context of the invention indicates that some mismatches in the antisense sequence are allowed as long as the functionality, i.e. promoting mRNA degradation is achieved. Preferably, the complementarity is from 90% to 100%. In general this allows for 1 or 2 mismatches in an AON of 20 nucleotides or 1, 2, 3 or 4 mismatches in an AON of 40 nucleotides, or 1, 2, 3, 4, 5 or 6 mismatches in an AON of 60 nucleotides, etc. Optionally, said AON may further be tested by transfection into COCH-expressing T-REx 293 cells or isolated cells from patients having a mutated COCH. The complementary regions are preferably designed such that, when combined, they are specific for the intron or exon in the pre-mRNA or mRNA. Such specificity may be created with various lengths of complementary regions, as this depends on the actual sequences in other (pre-)mRNA molecules in the system. The risk that the AON will also be able to hybridize to one or more other (pre-)mRNA molecules decreases with increasing size of the AON. It is clear that AONs comprising mismatches in the region of complementarity but that retain the capacity to hybridize and/or bind to the targeted region(s) in the (pre-)mRNA, can be used in the invention. However, preferably at least the complementary parts do not comprise such mismatches as AONs lacking mismatches in the complementary part typically have a higher efficiency and a higher specificity than AONs having such mismatches in one or more complementary regions. It is thought, that higher hybridization strengths, (i.e. increasing number of interactions with the opposing strand) are favorable in increasing the efficiency of the process of interfering with the splicing or mRNA degradation machinery of the system.

In certain embodiments, the degradation is nuclease degradation (e.g., RNase H).

The AON according to the invention preferably does not contain a stretch of CpG, more preferably does not contain any CpG. The presence of a CpG or a stretch of CpG in an oligonucleotide is usually associated with an increased immunogenicity of said oligonucleotide (Dorn and Kippenberger, 2008). This increased immunogenicity is undesired since it may induce damage of the tissue to be treated, i.e. the inner ear. Immunogenicity may be assessed in an animal model by assessing the presence of CD4+ and/or CD8+ cells and/or inflammatory mononucleocyte infiltration. Immunogenicity may also be assessed in blood of an animal or of a human being treated with an AON according to the invention by detecting the presence of a neutralizing antibody and/or an antibody recognizing said AON using a standard immunoassay known to the skilled person. An inflammatory reaction, type I-like interferon production, IL-12 production and/or an increase in immunogenicity may be assessed by detecting the presence or an increasing amount of a neutralizing antibody or an antibody recognizing said AON using a standard immunoassay. The AON according to the invention furthermore preferably has acceptable RNA binding kinetics and/or thermodynamic properties. The RNA binding kinetics and/or thermodynamic properties are at least in part determined by the melting temperature of an oligonucleotide (Tm; calculated with the oligonucleotide properties calculator (www.unc.edu/-cail/biotool/oligo/index) for single stranded RNA using the basic Tm and the nearest neighbor model), and/or the free energy of the AON-target intron/exon complex (using RNA structure version 4.5). If a Tm is too high, the AON is expected to be less specific. An acceptable Tm and free energy depend on the sequence of the AON. Therefore, it is difficult to give preferred ranges for each of these parameters. An acceptable Tm may be ranged between 35 and 70° C. and an acceptable free energy may be ranged between 15 and 45 kcal/mol.

In all embodiments, the nucleotide in the antisense oligonucleotide according to the invention may be, wherein a nucleotide in the antisense oligonucleotide may be an RNA residue, a DNA residue, and/or a nucleotide analogue or equivalent. Preferably, the antisense oligonucleotide comprises both RNA and DNA residues. More preferably, the antisense oligonucleotide as described herein is a GapmeR.

"GapmeR" or "gap oligomer", as used herein, refers to a chimeric oligomer having a central portion (a "gap") flanked by 3' and 5' "wings", wherein the gap has a modification that is different as compared to each of the wings. Such modifications may include nucleobase, monomeric linkage, and sugar modifications as well as the absence of a modification (such as unmodified RNA or DNA). Accordingly, a gapmer may be as simple as RNA wings separated by a DNA gap. In some cases, the nucleotide linkages in the wings may be different than the nucleotide linkages in the gap. In certain embodiments, each wing comprises nucleotides with high affinity modifications and the gap comprises nucleotides that do not comprise that modification.

Alternatively, the nucleotides in the gap and the nucleotides in the wings may have high affinity modifications, but the high affinity modifications in the gap are different than the high affinity modifications in each of the wings. The modifications in the wings may confer resistance to cleavage by endogenous nucleases, including RNaseH, while the modifications in the gap may be substrates for RNase H. The modifications in the wings may confer resistance to cleavage by endogenous nucleases, including RNaseH, while the modifications in the gap maybe substrates for RNase H. The modifications in the wings may be the same or different from one another. The nucleotides in the gap may be unmodified and nucleotides in the wings may be modified.

A GapmeR has a wing-gap-wing ratio, which may be represented numerically (wing #-gap #-wing #). The GapmeR may be symmetrical for example 7-12-7, 7-11-7, 7-10-7, 7-9-7, 7-8-7, 7-7-7, 7-6-7, 7-5-7, 7-4-7, 7-3-7, 6-12-6, 6-11-6, 6-10-6, 6-9-6, 6-8-6, 6-7-6, 6-6-6, 6-5-6, 6-4-6, 6-3-6, 6-2-6, 5-12-5, 5-11-5, 5-10-5, 5-9-5, 5-8-5, 5-7-5, 5-6-5, 5-5-5, 5-4-5, 5-3-5, 4-12-4, 4-11-4, 4-10-4, 4-9-4, 4-8-4, 4-7-4, 4-6-4, 4-5-4, 4-4-4, 4-3-4, 3-12-3, 3-11-3, 3-10-3, 3-9-3, 3-8-3, 3-7-3, 3-6-3, 3-5-3, or 3-4-3.

In one embodiment, the Gapmer may be asymmetrical for example, 8-13-9, 8-12-9, 8-11-9, 8-10-9, 8-9-9, 8-8-9, 8-7-9, 8-6-9, 8-5-9, 8-4-9, 8-3-9, 8-2-9, 8-1-9, 7-15-8, 7-14-8, 7-13-8, 7-12-8, 7-11-8, 7-10-8, 7-9-8, 7-8-8, 7-7-8, 7-6-8, 7-5-8, 7-4-8, 7-3-8, 7-2-8, 7-1-8, 6-15-7, 6-14-7, 6-13-7, 6-12-7, 6-11-7, 6-10-7, 6-9-7, 6-8-7, 6-7-7, 6-6-7, 6-5-7, 6-4-7, 6-3-7, 6-2-7, 6-1-7, 5-15-6, 5-14-6, 5-13-6, 5-12-6, 5-11-6, 5-10-6, 5-9-6, 5-8-6, 5-7-6, 5-6-6, 5-5-6, 5-4-6, 5-3-6, 5-2-6, 5-1-6, 4-15-5, 4-14-5, 4-13-5, 4-13-3, 4-12-5, 4-11-5, 4-10-5, 4-9-5, 4-8-5, 4-7-5, 4-6-5, 4-5-5, 4-4-5, 4-3-5, 4-2-5, 4-1-5, 3-17-4, 3-16-4, 3-15-4, 3-14-4, 3-13-4, 3-12-4, 3-11-4, 3-10-4, 3-9-4, 3-8-4, 3-7-4, 3-6-4, 3-5-4, 3-4-4, 3-3-4, 2-24-3, 2-23-3, 2-22-3, 2-21-3, 2-20-3, 2-19-3, 2-18-3, 2-17-3, 2-16-3, 2-15-3, 2-14-3, 2-13-3, 2-12-3, 2-11-3, 2-10-3, 2-9-3, 2-8-3, 2-7-3, 2-6-3, 2-5-3, 2-4-3, 1-26-2, 1-25-2, 1-24-2, 1-22-2, 1-21-2, 1-20-2, 1-19-2, 1-18-2, 1-17-2, 1-16-2, 1-15-2, 1-14-2, 1-13-2, 1-12-2, 1-11-2, 1-10-2, 1-9-2, 1-8-2, 1-7-2, 3-26-1, 3-5-1, 3-24-1, 3-22-1, 3-21-1, 3-20-1, 3-19-1, 3-18-1, 3-17-1, 3-16-1, 3-15-1, 3-14-1, 4-13-1, 4-12-1, 4-11-1, 4-10-1, 3-9-1, 3-8-1 or 4-7-1.

A preferred AON for the degradation of a mutated COCH according to the invention, has a length of from about 8 to about 40 nucleotides, preferably from about 10 to about 40 nucleotides, more preferably from about 14 to about 30 nucleotides, more preferably from about 16 to about 24 nucleotides, such as 16, 17, 18, 19, 20, 21, 22, 23 or 24 nucleotides. Preferably, an AON according to the invention has a length of at least 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 nucleotides. Most preferably, the AON has a length of about 20 nucleotides.

A preferred AON for the degradation of a mutated COCH according to the invention comprises or consists of an oligonucleotide with the sequence as set forward in SEQ ID NO: 27, 28, 29, 30, 31, 32, 33, 34, 35, 50, 53, 54, 55, 56, or 57.

In an embodiment, the AON as described herein is complementary to a polynucleotide with the nucleotide sequence as set forward in SEQ ID NO: 3 and the preferred AONs comprise or consist of a sequence selected from the group consisting of SEQ ID NO: 27, 28, 29, 30, 31, 33, and 34.

In an embodiment, the AON as described herein is complementary to a polynucleotide with the nucleotide sequence as set forward in SEQ ID NO: 4 and the preferred AONs comprise or consist of a sequence selected from the group consisting of SEQ ID NO: 27, 28, 29, 30, 31, 33, and 34.

In an embodiment, the AON as described herein is complementary to a polynucleotide with the nucleotide sequence as set forward in SEQ ID NO: 5 and the preferred AONs comprise or consist of a sequence selected from the group consisting of SEQ ID NO: 27, 28, 29, 30, 31, 33, and 34.

In an embodiment, the AON as described herein is complementary to a polynucleotide with the nucleotide sequence as set forward in any one of SEQ ID NO: 12, 13 and 14 and the preferred AONs comprise or consist of a sequence selected from SEQ ID NO: 35 and 50.

In an embodiment, the AON as described herein is complementary to a polynucleotide with the nucleotide sequence as set forward in any one of SEQ ID NO: 24, 25 and 26 and the preferred AONs comprise or consist of a sequence selected from the group consisting of SEQ ID NO: 53, 54, 55, 56 and 57, preferably the AON comprise or consist sequence SEQ ID NO: 53 or SEQ ID NO: 56.

It is preferred that an AON for the degradation of a mutated COCH according to the invention comprises one or more residues that are modified to increase nuclease resistance, and/or to increase the affinity of the antisense oligonucleotide for the target sequence. Therefore, in a preferred embodiment, the AON comprises at least one nucleotide analogue or equivalent, wherein a nucleotide analogue or equivalent is defined as a residue having a modified base, and/or a modified backbone, and/or a non-natural internucleoside linkage, or a combination of these modifications.

In a preferred embodiment, the nucleotide analogue or equivalent comprises a modified backbone. Examples of such backbones are provided by morpholino backbones, carbamate backbones, siloxane backbones, sulfide, sulfoxide and sulfone backbones, formacetyl and thioformacetyl backbones, methyleneformacetyl backbones, riboacetyl backbones, alkene containing backbones, sulfamate, sulfonate and sulfonamide backbones, methyleneimino and methylenehydrazino backbones, and amide backbones. Phosphorodiamidate morpholino oligomers are modified backbone oligonucleotides that have previously been investigated as antisense agents. Most preferably, the AON according to the invention comprises a phosphorothioate backbone.

Morpholino oligonucleotides have an uncharged backbone in which the deoxyribose sugar of DNA is replaced by a six membered ring and the phosphodiester linkage is replaced by a phosphorodiamidate linkage. Morpholino oligonucleotides are resistant to enzymatic degradation and appear to function as antisense agents by arresting translation or interfering with pre-mRNA splicing rather than by activating RNase H. Morpholino oligonucleotides have been successfully delivered to tissue culture cells by methods that physically disrupt the cell membrane, and one study comparing several of these methods found that scrape loading was the most efficient method of delivery; however, because the morpholino backbone is uncharged, cationic lipids are not effective mediators of morpholino oligonucleotide uptake in cells. A recent report, demonstrated triplex formation by a morpholino oligonucleotide and, because of the non-ionic backbone, these studies showed that the morpholino oligonucleotide was capable of triplex formation in the absence of magnesium.

It is further preferred that the linkage between the residues in a backbone do not include a phosphorus atom, such as a linkage that is formed by short chain alkyl or cycloalkyl internucleoside linkages, mixed heteroatom and alkyl or cycloalkyl internucleoside linkages, or one or more short chain heteroatomic or heterocyclic internucleoside linkages.

A preferred nucleotide analogue or equivalent comprises a Peptide Nucleic Acid (PNA), having a modified polyamide backbone (Nielsen et al., 1991). PNA-based molecules are true mimics of DNA molecules in terms of base-pair recognition. The backbone of the PNA is composed of N-(2-aminoethyl)-glycine units linked by peptide bonds, wherein the nucleobases are linked to the backbone by methylene carbonyl bonds. An alternative backbone comprises a one-carbon extended pyrrolidine PNA monomer (Govindaraju and Kumar, 2005). Since the backbone of a PNA molecule contains no charged phosphate groups, PNA-RNA hybrids are usually more stable than RNA-RNA or RNA-DNA hybrids, respectively (Egholm et al., 1993). A further preferred backbone comprises a morpholino nucleotide analog or equivalent, in which the ribose or deoxyribose sugar is replaced by a 6-membered morpholino ring. A most preferred nucleotide analog or equivalent comprises a phosphorodiamidate morpholino oligomer (PMO), in which the ribose or deoxyribose sugar is replaced by a 6-membered morpholino ring, and the anionic phosphodiester linkage between adjacent morpholino rings is replaced by a non-ionic phosphorodiamidate linkage.

In yet a further embodiment, a nucleotide analogue or equivalent according to the invention comprises a substitution of one of the non-bridging oxygens in the phosphodiester linkage. This modification slightly destabilizes base-pairing but adds significant resistance to nuclease degradation. A preferred nucleotide analogue or equivalent comprises phosphorothioate, chiral phosphorothioate, phosphorodithioate, phosphotriester, aminoalkylphosphotriester, H-phosphonate, methyl and other alkyl phosphonate including 3'-alkylene phosphonate, 5'-alkylene phosphonate and chiral phosphonate, phosphinate, phosphoramidate including 3'-amino phosphoramidate and aminoalkylphosphoramidate, thionophosphoramidate, thionoalkylphosphonate, thionoalkylphosphotriester, selenophosphate or boranophosphate.

A further preferred nucleotide analogue or equivalent according to the invention comprises one or more sugar moieties that are mono- or disubstituted at the 2', 3' and/or 5' position such as a —OH; —F; substituted or unsubstituted, linear or branched lower (CI-C10) alkyl, alkenyl, alkynyl, alkaryl, allyl, or aralkyl, that may be interrupted by one or more heteroatoms; O-, S-, or N-alkyl; O-, S-, or N-alkenyl; O-, S- or N-alkynyl; O-, S-, or N-allyl; O-alkyl-O-alkyl, -methoxy, -aminopropoxy; methoxyethoxy; dimethylaminooxyethoxy; and -dimethylaminoethoxyethoxy. The sugar moiety can be a pyranose or derivative thereof, or a deoxypyranose or derivative thereof, preferably ribose or derivative thereof, or deoxyribose or derivative of. A preferred derivatized sugar moiety comprises a Locked Nucleic Acid (LNA), in which the 2'-carbon atom is linked to the 3' or 4' carbon atom of the sugar ring thereby forming a bicyclic sugar moiety. A preferred LNA comprises 2'-O, 4'-C-ethylene-bridged nucleic acid (Morita et al., 2001).

These substitutions render the nucleotide analogue or equivalent RNase H and nuclease resistant and increase the affinity for the target RNA. In another embodiment, a nucleotide analogue or equivalent according to the invention comprises one or more base modifications or substitutions. Modified bases comprise synthetic and natural bases such as inosine, xanthine, hypoxanthine and other -aza, deaza, -hydroxy, -halo, -thio, thiol, -alkyl, -alkenyl, -alkynyl, thioalkyl derivatives of pyrimidine and purine bases that are or will be known in the art.

It is understood by a skilled person that it is not necessary for all positions in an AON to be modified uniformly. In addition, more than one of the aforementioned analogues or equivalents may be incorporated in a single AON or even at a single position within an AON. In certain embodiments, an AON according to the invention has at least two different types of analogues or equivalents. Accordingly, in a preferred embodiment an antisense oligonucleotide for the degradation of a mutated COCH according to the invention, comprises a 2'-O alkyl phosphorothioate antisense oligonucleotide, such as 2'-O-methyl modified ribose (RNA), 2'-O-ethyl modified ribose, 2'-O-propyl modified ribose, and/or substituted derivatives of these modifications such as halogenated derivatives.

Preferably, when the AONs according to the invention is a gapmer, the gapmer is modified to comprise a phosphorothioate backbone and a 2'-O-methyl modified ribose.

It will also be understood by a skilled person that different antisense oligonucleotides can be combined for the specific degradation of a mutated COCH. Accordingly, the invention provides for a set of antisense oligonucleotide for promoting specific degradation of COCH comprising at least two antisense oligonucleotides as defined herein.

An AON for the specific degradation of a mutated COCH to the invention may be indirectly administrated using suitable means known in the art. It may for example be provided to an individual or a cell, tissue or organ of said individual as such, as a so-called 'naked' AON. It may also be administered in the form of an expression vector wherein the expression vector encodes an RNA transcript comprising the sequence of said AON according to the invention. The expression vector is preferably introduced into a cell, tissue, organ or individual via a gene delivery vehicle. In a preferred embodiment, when the AON comprises or consists of unmodified RNA residues, there is provided a viral-based expression vector comprising an expression cassette or a transcription cassette that drives expression or transcription of an AON according to the invention. Accordingly, the invention provides for a viral vector expressing antisense oligonucleotide according to the invention when placed under conditions conducive to expression of the antisense oligonucleotide. A cell can be provided with an AON for the specific degradation of a mutated COCH to the invention by plasmid-derived antisense oligonucleotide expression or viral expression provided by adenovirus- or adeno-associated virus-based vectors. Expression may be driven by an RNA polymerase II promoter (Pol II) such as a U7 RNA promoter or an RNA polymerase III (Pol III) promoter, such as a U6 RNA promoter. A preferred delivery vehicle is a viral vector such as an adeno-associated virus vector (AAV), or a retroviral vector such as a lentivirus vector and the like. Also, plasmids, artificial chromosomes, plasmids usable for targeted homologous recombination and integration in the human genome of cells may be suitably applied for delivery of an AON according to the invention. Preferred for the invention are those vectors wherein transcription is driven from PolIII promoters, and/or wherein transcripts are in the form fusions with U1 or U7 transcripts, which yield good results for delivering small transcripts. It is within the skill of the artisan to design suitable transcripts. Preferred are PolIII driven transcripts, preferably, in the form of a fusion transcript with an U1 or U7 transcript. Such fusions may be generated as previously described (Gorman et al., 1998).

A preferred expression system for an AON for specific degradation of a mutated COCH according to the invention is an adenovirus associated virus (AAV)-based vector. Single chain and double chain AAV-based vectors have been developed that can be used for prolonged expression of antisense nucleotide sequences for highly efficient degradation of transcripts. A preferred AAV-based vector, for instance, comprises an expression cassette that is driven by an RNA polymerase III-promoter (Pol III) or an RNA polymerase II promoter (Pol II). A preferred RNA promoter is, for example, a Pol III U6 RNA promoter, or a Pol II U7 RNA promoter.

The invention accordingly provides for a viral-based vector, comprising a Pol II or a Pol III promoter driven expression cassette for expression of an AON for the specific degradation of a mutated COCH according to the invention.

An AAV vector according to the invention is a recombinant AAV vector and refers to an AAV vector comprising part of an AAV genome comprising an encoded AON for the specific degradation of a mutated COCH according to the invention encapsidated in a protein shell of capsid protein derived from an AAV serotype as depicted elsewhere herein. Part of an AAV genome may contain the inverted terminal repeats (ITR) derived from an adeno-associated virus serotype, such as AAV1, AAV2, AAV3, AAV4, AAV5, AAV8, AAV9 and others. A protein shell comprised of capsid protein may be derived from an AAV serotype such as AAV1, 2, 3, 4, 5, 8, 9 and others. A protein shell may also be named a capsid protein shell. AAV vector may have one or preferably all wild type AAV genes deleted, but may still comprise functional ITR nucleic acid sequences. Functional ITR sequences are necessary for the replication, rescue and packaging of AAV virions. The ITR sequences may be wild type sequences or may have at least 80%, 85%, 90%, 95, or 100% sequence identity with wild type sequences or may be altered by for example in insertion, mutation, deletion or substitution of nucleotides, as long as they remain functional. In this context, functionality refers to the ability to direct packaging of the genome into the capsid shell and then allow for expression in the host cell to be infected or target cell. In the context of the invention a capsid protein shell may be of a different serotype than the AAV vector genome ITR. An AAV vector according to present the invention may thus be composed of a capsid protein shell, i.e. the icosahedral capsid, which comprises capsid proteins (VP1, VP2, and/or VP3) of one AAV serotype, e.g. AAV serotype 2, whereas the ITRs sequences contained in that AAV5 vector may be any of the AAV serotypes described above, including an AAV2 vector. An "AAV2 vector" thus comprises a capsid protein shell of AAV serotype 2, while e.g. an "AAV5 vector" comprises a capsid protein shell of AAV serotype 5, whereby either may encapsidate any AAV vector genome ITR according to the invention.

Preferably, a recombinant AAV vector according to the invention comprises a capsid protein shell of AAV serotype 2, 5, 8 or AAV serotype 9 wherein the AAV genome or ITRs present in said AAV vector are derived from AAV serotype 2, 5, 8 or AAV serotype 9; such AAV vector is referred to as an AAV2/2, AAV 2/5, AAV2/8, AAV2/9, AAV5/2, AAV5/5, AAV5/8, AAV 5/9, AAV8/2, AAV 8/5, AAV8/8, AAV8/9, AAV9/2, AAV9/5, AAV9/8, or an AAV9/9 vector.

More preferably, a recombinant AAV vector according to the invention comprises a capsid protein shell of AAV serotype 2 and the AAV genome or ITRs present in said vector are derived from AAV serotype 5; such vector is referred to as an AAV 2/5 vector.

More preferably, a recombinant AAV vector according to the invention comprises a capsid protein shell of AAV serotype 2 and the AAV genome or ITRs present in said vector are derived from AAV serotype 8; such vector is referred to as an AAV 2/8 vector.

More preferably, a recombinant AAV vector according to the invention comprises a capsid protein shell of AAV serotype 2 and the AAV genome or ITRs present in said vector are derived from AAV serotype 9; such vector is referred to as an AAV 2/9 vector.

More preferably, a recombinant AAV vector according to the invention comprises a capsid protein shell of AAV serotype 2 and the AAV genome or ITRs present in said vector are derived from AAV serotype 2; such vector is referred to as an AAV 2/2 vector.

A nucleic acid molecule encoding an AON according to the invention represented by a nucleic acid sequence of choice is preferably inserted between the AAV genome or ITR sequences as identified above, for example an expression construct comprising an expression regulatory element operably linked to a coding sequence and a 3' termination sequence.

"AAV helper functions" generally refers to the corresponding AAV functions required for AAV replication and packaging supplied to the AAV vector in trans. AAV helper functions complement the AAV functions which are missing in the AAV vector, but they lack AAV ITRs (which are provided by the AAV vector genome). AAV helper functions include the two major ORFs of AAV, namely the rep coding region and the cap coding region or functional substantially identical sequences thereof. Rep and Cap regions are well known in the art, see e.g. (Chiorini et al., 1999) or U.S. Pat. No. 5,139,941, incorporated herein by reference. The AAV helper functions can be supplied on an AAV helper construct, which may be a plasmid. Introduction of the helper construct into the host cell can occur e.g. by transformation, transfection, or transduction prior to or concurrently with the introduction of the AAV genome present in the AAV vector as identified herein. The AAV helper constructs according to the invention may thus be chosen such that they produce the desired combination of serotypes for the AAV vector's capsid protein shell on the one hand and for the AAV genome present in said AAV vector replication and packaging on the other hand.

"AAV helper virus" provides additional functions required for AAV replication and packaging. Suitable AAV helper viruses include adenoviruses, herpes simplex viruses (such as HSV types 1 and 2) and vaccinia viruses. The additional functions provided by the helper virus can also be introduced into the host cell via vectors, as described in U.S. Pat. No. 6,531,456 incorporated herein by reference.

Preferably, an AAV genome as present in a recombinant AAV vector according to the invention does not comprise any nucleotide sequences encoding viral proteins, such as the rep (replication) or cap (capsid) genes of AAV. An AAV genome may further comprise a marker or reporter gene, such as a gene for example encoding an antibiotic resistance gene, a fluorescent protein (e.g. gfp) or a gene encoding a chemically, enzymatically or otherwise detectable and/or selectable product (e.g. lacZ, aph, etc.) known in the art.

A preferred AAV vector according to the invention is an AAV vector, preferably an AAV2/5, AAV2/8, AAV2/9 or AAV2/2 vector, carrying an AON for promoting mRNA degradation according to the invention that is an AON that comprises, or preferably consists of, a sequence that is: complementary or substantially complementary to a nucleotide sequence consisting of SEQ ID NO 1 or SEQ ID NO: 2, preferably the antisense oligonucleotide moiety binds to or is complementary to a polynucleotide part within SEQ ID NO: 1 or SEQ ID NO: 2 with a nucleotide sequence selected from the group consisting of SEQ ID NO: 6, 7, 8, 9, 10, 11, 12, 13, 14, 15, 16, 17, 18, 19, 20, 21, 22, 23, 24, 25, or 26.

Even more preferably, the AON comprises or consists of a polynucleotide with a nucleotide sequence selected from the group consisting of SEQ ID NO: 27, 28, 29, 30, 31, 32, 33, 34, 35, 50, 53, 54, 55, 56 and 57.

Improvements in means for providing an individual or a cell, tissue, organ of said individual with an AON for promoting the degradation of mutated COCH mRNA according to the invention, are anticipated considering the progress that has already thus far been achieved. Such future improvements may of course be incorporated to achieve the mentioned effect on restructuring of mRNA using a method according to the invention.

Alternatively, a preferred delivery method for an AON the specific degradation of a mutated COCH as described herein or a plasmid for expression of such AON is a viral vector or are nanoparticles. Alternatively, a plasmid can be provided by transfection using known transfection agents. For intravenous, subcutaneous, intratympanic, nasal, intramuscular, intrathecal and/or intraventricular administration it is preferred that the solution is a physiological salt solution. Particularly preferred in the invention is the use of an excipient or transfection agents that will aid in delivery of each of the constituents as defined herein to a cell and/or into a cell, preferably a cell expressing the mutated COCH. Preferred are excipients or transfection agents capable of forming complexes, nanoparticles, micelles, vesicles and/or liposomes that deliver each constituent as defined herein, complexed or trapped in a vesicle or liposome through a cell membrane. Many of these excipients are known in the art. Suitable excipients or transfection agentia comprise polyethylenimine (PEI; ExGen500 (MBI Fermentas)), LipofectAMINE™ 2000 (Invitrogen) or derivatives thereof, or similar cationic polymers, including polypropyleneimine or polyethylenimine copolymers (PECs) and derivatives, synthetic amphiphils (SAINT-18), Lipofectin™, DOTAP and/or viral capsid proteins that are capable of self-assembly into particles that can deliver each constituent as defined herein to a cell, preferably a cell that expresses mutated COCH. Such excipients have been shown to efficiently deliver an oligonucleotide such as AONs to a wide variety of cultured cells in vitro, including COCH-expressing T-REx 293 cells. The ease of structural modification can be used to allow further modifications and the analysis of their further (in vivo) nucleic acid transfer characteristics and toxicity.

Lipofectin represents an example of a liposomal transfection agent. It consists of two lipid components, a cationic lipid N-[1-(2,3 dioleoyloxy)propyl]-N, N, N-trimethylammonium chloride (DOTMA) (cp. DOTAP which is the methylsulfate salt) and a neutral lipid dioleoylphosphatidylethanolamine (DOPE). The neutral component mediates the intracellular release. Another group of delivery systems are polymeric nanoparticles.

Polycations such as diethylaminoethylaminoethyl (DEAE)-dextran, which are well known as DNA transfection reagent can be combined with butylcyanoacrylate (PBCA) and hexylcyanoacrylate (PHCA) to formulate cationic nanoparticles that can deliver each constituent as defined herein, preferably an AON according to the invention, across cell membranes into cells.

In addition to these common nanoparticle materials, the cationic peptide protamine offers an alternative approach to formulate an oligonucleotide with colloids. This colloidal nanoparticle system can form so called proticles, which can be prepared by a simple self-assembly process to package and mediate intracellular release of an oligonucleotide. The skilled person may select and adapt any of the above or other commercially available alternative excipients and delivery systems to package and deliver an AON for use in the current invention to deliver it for the prevention, treatment or delay of a COCH related disease or a condition requiring the degradation of mutated COCH (pre)mRNA. "Prevention, treatment or delay of an COCH related disease or a condition related disease or condition" is herein preferably defined as preventing, halting, ceasing the progression of, or (partially) reversing the formation of cytotoxic cochlin dimers.

In addition, an AON according to the invention could be covalently or non-covalently linked to a targeting ligand specifically designed to facilitate the uptake into the cell, cytoplasm and/or its nucleus. Such ligand could comprise (i) a compound (including but not limited to peptide(-like) structures) recognizing cell, tissue or organ specific elements facilitating cellular uptake and/or (ii) a chemical compound able to facilitate the uptake in to cells and/or the intracellular release of an oligonucleotide from vesicles, e.g. endosomes or lysosomes.

Therefore, in a preferred embodiment, an AON for the degradation of a mutated COCH transcript according to the invention is formulated in a composition or a medicament or a composition, which is provided with at least an excipient and/or a targeting ligand for delivery and/or a delivery device thereof to a cell and/or enhancing its intracellular delivery.

It is to be understood that if a composition comprises an additional constituent such as an adjunct compound as later defined herein, each constituent of the composition may not be suitably formulated in one single combination or composition or preparation. Depending on their identity and specific features, the skilled person will know which type of formulation is the most appropriate for each constituent as defined herein. In a preferred embodiment, the invention provides a composition or a preparation which is in the form of a kit of parts comprising an AON for the degradation of a mutated COCH according to the invention and a further adjunct compound as later defined herein.

If required and/or if desired, an AON for the degradation of a mutated COCH transcript, a set of antisense oligonucleotides according to the invention, or a vector, preferably a viral vector, according to the invention, carrying naked AONs or expressing an AON for degrading the mutated COCH transcript according to the invention can be incorporated into a pharmaceutically active mixture by adding a pharmaceutically acceptable carrier.

Accordingly, the invention also provides for a composition, preferably a pharmaceutical composition comprising an antisense oligonucleotide for the specific degradation of a mutated COCH transcript, according to the invention and a pharmaceutically acceptable excipient. Such composition may comprise a single AON for degrading mutated COCH transcripts according to the invention, but may also comprise multiple, distinct AONs as described herein. Such a pharmaceutical composition may comprise any pharmaceutically acceptable excipient, including a carrier, filler, preservative, adjuvant, solubilizer and/or diluent. Such pharmaceutically acceptable carrier, filler, preservative, adjuvant, solubilizer and/or diluent may for instance be found in Remington, 2000. Each feature of said composition has earlier been defined herein.

A preferred route of administration is administration into the inner ear (intratympanic). More preferred is administration into the cochlea and/or into the vestibular organ. In one embodiment, the route of administration is nasal delivery.

A preferred AON for the specific degradation of a mutated COCH transcript according to the invention, is for the treatment of an COCH related disease or condition of an individual. In all embodiments of the invention, the term "treatment" is understood to include the prevention and/or delay of the COCH related disease or a condition requiring degradation of the (pre)-mRNA of COCH or promoting degradation of mutated COCH mRNA. An individual, which may be treated using an AON according to the invention may already have been diagnosed as having an COCH-related disease or condition, such as DFNA9.

Alternatively, an individual which may be treated using an AON according to the invention may not have yet been clinically diagnosed as having a COCH-related disease or condition requiring the degradation of COCH but may be an individual having an increased risk of developing a COCH-related disease or condition, such as DFNA9 in the future given his or her genetic background. A preferred individual is a human being. In all embodiments of the invention, the COCH-related disease or condition preferably is a condition resulting in hearing impairment and/or vestibular dysfunction, preferably wherein the condition is a vestibulo-cochlear disorder, more preferably wherein the disease or condition is DFNA9.

Accordingly, the invention further provides for an antisense oligonucleotide according to the invention, a set of antisense oligonucleotides according to the invention, or a viral vector according to the invention, or a (pharmaceutical) composition according to the invention for use as a medicament, preferably as a medicament for the treatment of an COCH-related disease or condition requiring the degradation of a mutated COCH and for use as a medicament for the prevention, treatment or delay of an COCH-related disease or condition requiring degradation of a mutated COCH transcript. Each feature of all medical use embodiment herein has earlier been defined herein and is preferably such feature as earlier defined herein.

The invention further provides for the use of an AON to the invention, a set of antisense oligonucleotides according to the invention, a vector according to the invention or a (pharmaceutical) composition according to the invention for treating an COCH-related disease or condition requiring the degradation of mutated COCH transcript. Each feature of all medical use embodiment herein has earlier been defined herein and is preferably such feature as earlier defined herein.

The invention further provides for, a method of treatment of an COCH-related disease or condition requiring degradation of a mutated COCH transcript, said method comprising contacting a cell of said individual with an AON as described herein, a vector according as described herein or a (pharmaceutical) composition as described herein. Each feature of all medical use embodiment herein has earlier been defined herein and is preferably such feature as earlier defined herein.

The invention further provides for the use of an AON as described herein, a set of antisense oligonucleotides according to the invention, a vector according to the invention or a (pharmaceutical) composition according to the invention for the preparation of a medicament for the treatment of an COCH-related disease or condition requiring the specific degradation of COCH transcripts. Each feature of all medical use embodiment herein has earlier been defined herein and is preferably such feature as earlier defined herein.

The invention further provides for an antisense oligonucleotide as described herein, a set of antisense oligonucleotides as described herein, the use as described herein or the method according as described herein, wherein the COCH related disease or condition requiring degradation of a mutated COCH is a condition resulting in hearing impairment and/or vestibular dysfunction, preferably wherein the condition is a vestibulo-cochlear disorder, more preferably wherein the disease or condition is DFNA9.

Treatment in a use or in a method according to the invention is preferably at least once, and preferably lasts at least one week, one month, several months, one year, 2, 3, 4, 5, 6 years or longer, such as life-long. Each AON as defined herein for use according to the invention may be suitable for direct administration to a cell, tissue and/or an organ in vivo of individuals already affected or at risk of developing an COCH related disease or condition requiring degradation of mutated COCH transcripts, such as vestibulo-cochlear disorder or DFNA9, and may be administered directly in vivo, ex vivo or in vitro. The frequency of administration of an AON, composition, compound or adjunct compound according to the invention may depend on several parameters such as the severity of the disease, the age of the patient, the mutation of the patient, the number of AON according to the invention (i.e. dose), the formulation of the AON, composition, stability of the AON, binding affinity of the AON to the target, compound or adjunct compound according to the invention, the route of administration and so forth. The frequency of administration may vary between daily, weekly, at least once in two weeks, or three weeks or four weeks or five weeks or a longer time period.

Dose ranges of an AON, composition, compound or adjunct compound according to the invention are preferably designed on the basis of rising dose studies in clinical trials (in vivo use) for which rigorous protocol requirements exist. An AON according to the invention may be used at a dose which is ranged from 0.01 and 20 mg/kg, preferably from 0.05 and 20 mg/kg.

In a preferred embodiment, a viral vector, preferably an AAV vector as described earlier herein, as delivery vehicle for an AON according to the invention, is administered in a dose ranging from $1 \times 10^{09}$-$1 \times 10^{17}$ virus particles per injection, more preferably from $1 \times 10^{10}$-$1 \times 10^{12}$ virus particles per injection.

The ranges of concentration or dose of AONs as depicted above are preferred concentrations or doses for in vivo, in vitro or ex vivo uses. The skilled person will understand that depending on the AONs used, the target cell to be treated, the gene target and its expression levels, the medium used and the transfection and incubation conditions, the concentration or dose of AONs used may further vary and may need to be optimized any further.

An AON according to the invention, a set of antisense oligonucleotides according to the invention, or a viral vector according to the invention, or a composition according to the invention for use according to the invention may be administered to a cell, tissue and/or an organ in vivo of individuals already affected or at risk of developing a COCH related disease or a condition requiring degradation of mutated COCH transcripts, and may be administered in vivo, ex vivo or in vitro. An AON according to the invention, or a viral vector according to the invention, or a composition according to the invention may be directly or indirectly administered to a cell, tissue and/or an organ in vivo of an individual already affected by or at risk of developing a COCH related disease and may be administered directly or indirectly in vivo, ex vivo or in vitro.

The invention further provides for a method for degrading mutated COCH transcripts in a cell, said method comprising contacting the cell, preferably a cell expressing mutated COCH, with an antisense oligonucleotide according to the invention, a set of antisense oligonucleotides according to the invention, the vector according to the invention or the pharmaceutical composition according to the invention. The features of this aspect are preferably those defined earlier herein. Contacting the cell with an AON according to the invention, a set of antisense oligonucleotides according to the invention, or a viral vector according to the invention, or a composition according to the invention may be performed by any method known by the person skilled in the art. Use of the methods for delivery of AONs viral vectors and compositions as described earlier herein is included. Contacting may be directly or indirectly and may be in vivo, ex vivo or in vitro.

Unless otherwise indicated each embodiment as described herein may be combined with another embodiment as described herein.

Definitions

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

The word "about" or "approximately" when used in association with a numerical value (e.g. about 10) preferably means that the value may be the given value (of 10) more or less 5% of the value. The sequence information as provided herein should not be so narrowly construed as to require inclusion of erroneously identified bases. The skilled person is capable of identifying such erroneously identified bases and knows how to correct for such errors.

All patent and literature references cited in the present specification are hereby incorporated by reference in their entirety.

DESCRIPTION OF THE FIGURES

FIG. 1: Schematic representation of the mutant-allele COCH haplotype analysis. A) A) Low frequency (<0.1 allele frequency) variants on the c.151C>T (p.P51S) haplotype. The 6 variants in intron 7 are c.629+1186T>C, c.629+1779delC, c.629+1807delA, c.629+1809A>C, c.629+1812A>T and c.630-208A>C. B) Low frequency (<0.1 allele frequency) variants on the c.263G>A (p.G88E) haplotype.

DESCRIPTION OF THE SEQUENCES

TABLE 1

Sequences

Figure 2A:
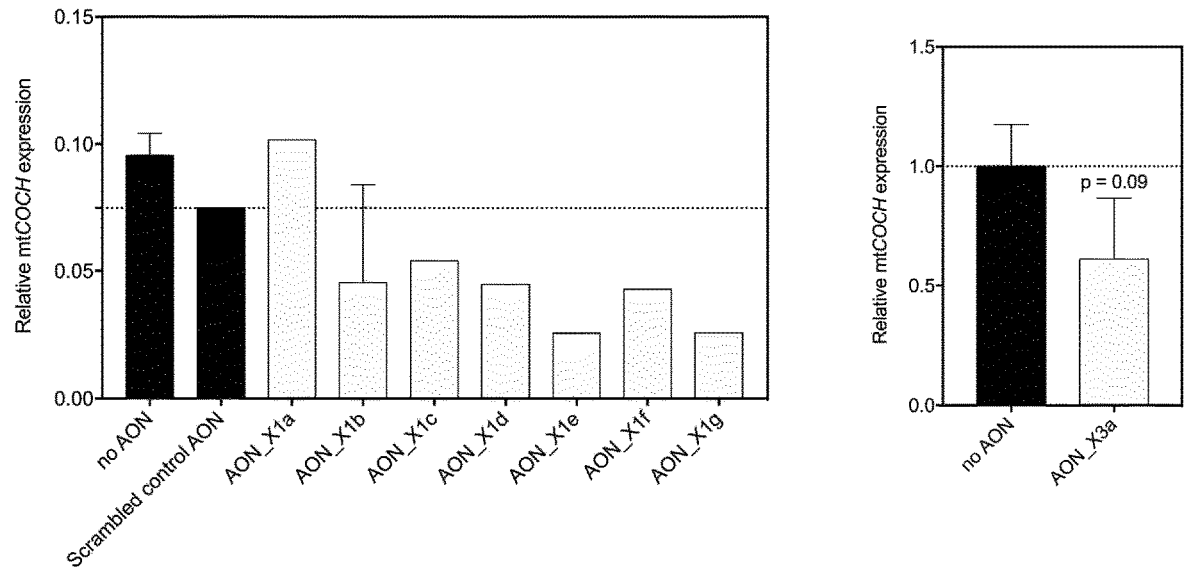
FIG. 2: Screening of different AON sequences that reduce the level of c.151C>T mutant COCH transcripts. A) Left panel: Relative mutant COCH expression levels after treatment with AONs complementary to c.151C>T mutation and surrounding sequence in COCH. Right panel: Relative mutant COCH expression levels after treatment with AON_X3a, complementary to the c.436+368_436+369 dupAG variant and surrounding sequence on the c.151C>T allele. All AONs were delivered in a 250 nM concentration. COCH expression is shown relative to the expression of the housekeeping gene RPS18. B) Relative mutant COCH expression levels after treatment with AONs complementary to c.436+368_436+369 dupAG variant and surrounding region, which is located on the c.151C>T mutant COCH allele. All AONs were delivered at a concentration of 250 nM. COCH expression is shown relative to the expression of the housekeeping gene RPS18.

| SEQ ID NO: | Name |
|---|---|
| 1 | mRNA COCH c.151C > T |
| 2 | mRNA COCH c.263G > A |
| 3 | Target c.151C > T + 10 |
| 4 | Target c.151C > T + 5 |
| 5 | Target c.151C > T |
| 6 | Target c.436 + 368_436 + 369dupAG + 10 |
| 7 | Target c.436 + 368_436 + 369dupAG + 5 |
| 8 | Target c.436 + 368_436 + 369dupAG |
| 9 | Target c.629 + 1779delC + 10 |
| 10 | Target c.629 + 1779delC + 5 |
| 11 | Target c.629 + 1779delC |
| 12 | Target c.629 + 1807delA and c.629 + 1809A > C and c.629 + 1812A > T + 10 |
| 13 | Target c.629 + 1807delA and c.629 + 1809A > C and c.629 + 1812A > T + 5 |
| 14 | Target c.629 + 1807delA and c.629 + 1809A > C and c.629 + 1812A > T |
| 15 | Target c.630 − 208A > C + 10 |
| 16 | Target c.630 − 208A > C + 5 |
| 17 | Target c.630 − 208A > C |
| 18 | Target c.734 − 304T > G + 10 |
| 19 | Target c.734 − 304T > G + 5 |
| 20 | Target c.734 − 304T > G |
| 21 | Target c.1477 + 9C > A + 10 |
| 22 | Target c.1477 + 9C > A + 5 |
| 23 | Target c.1477 + 9C > A |
| 24 | Target c.263G > A + 10 |
| 25 | Target c.263G > A + 5 |
| 26 | Target c.263G > A |
| 27 | AON X1a |
| 28 | AON X1b |
| 29 | AON X1c |
| 30 | AON X1d |
| 31 | AON X1e |
| 32 | AON X1f |
| 33 | AON X1g |
| 34 | AON X1h |
| 35 | AON X3a |
| 36 | Primer |
| 37 | Primer |
| 38 | Primer |
| 39 | Primer |
| 40 | Primer |
| 41 | Primer |
| 42 | Primer |
| 43 | Primer |
| 44 | Primer |
| 45 | Primer |
| 46 | Primer |
| 47 | Primer |
| 48 | Primer |
| 49 | Primer |
| 50 | AON_X4a |
| 51 | Primer |
| 52 | Primer |
| 53 | AON_X3b |
| 54 | AON_X3c |
| 55 | AON_X3d |
| 56 | AON_X3e |
| 57 | AON_X3f |

EXAMPLES

Materials and Methods

Identification of Mutant Allele-Specific Variants in COCH

DNA samples of three seemingly unrelated DFNA9 patients carrying the c.151C>T mutation, and one sample from a patient carrying the c.263G>A mutation, were selected for long-read single-molecule (SMRT) sequencing (Pacific Biosciences) to identify shared variants on the mutant allele. The genomic COCH sequence was divided in overlapping fragments (FIG. 1A), which were amplified with Q5 polymerase (NEB) and primers 5'-GAAGTTCGGTTCTCAGGCC-3' (SEQ ID NO: 36) and 5'-TGCCATCGTCATACAAAAGG-3' (SEQ ID NO: 37) (fragment 1), 5'-CAAAATCTGGAATGGTATGGAAG-3' (SEQ ID NO: 38) and 5'-GATCAAATGCAGACCTAGCC-3' (SEQ ID NO: 39) (fragment 2) and 5'-TCCCCTGCAGTACTTTTTGTC-3' (SEQ ID NO: 40) and 5'-GTAAGCCAGCTTACAATAACTC-3' (SEQ ID NO: 41) (fragment 3). Sequence results for the individual fragments were assembled based on the presence of haplotype-specific variants. Identified mutant allele-specific variants with an allele frequency<0.1 in the non-Finnish European population were validated by Sanger sequencing and segregation analysis in two seemingly unrelated families with DFNA9.

Generation of a Stable Cell Line with TET-Inducible COCH Expression.

The genomic regions of wildtype and mutant COCH exons 1 to 7 (transcript variant 1; Ref.Seq. NM_001135058.1), including the haplotype specific variants, were amplified from the translation initiation site to the splice donor site of exon 7 using primers 5'-ATGTCCGCAGCCTGGATC-3' (SEQ ID NO: 42) and 5'-GGCTTGAACAAGGCCCACA-3' (SEQ ID NO: 43). These sequences were subsequently cloned into the pgLAP1 vector using Gateway cloning technology (Invitrogen). Upon sequence validation, pgLAP1-wtCOCH and pgLAP1-P51S-COCH constructs were co-transfected with pOGG44, encoding Flp-Recombinase, in Flp-in™ T-REx™ 293 cells using polyethylenimine. Cells in which the COCH sequence was stably integrated within the genome were selected in DMEM media containing 100 µg/ml hygromycin. Hygromycin-resistant colonies were expanded and subsequently tested for induction of expression by tetracycline using an allele-specific TaqMan assay.

Delivery of RNase H1-Dependent Antisense Oligonucleotides

Wildtype and mutant COCH-expressing Flp-in™ T-REx™ 293 cells were cultured in high glucose DMEM-AQ (Sigma Aldrich, Saint Louis, USA) supplemented with 10% Fetal Calf Serum, 1% Penicillin/Streptomycin, Sodium Pyruvate, 15 ug/ml blasticidin and 100 ug/ml hygromycin. Cells were seeded in 12-well or 24-well plates at a confluency of ~50%. Next day, culture medium was replaced with medium containing 0.25 µg/ml tetracycline to induce transcript of the introduced COCH gene. After twenty hours, tetracycline-containing medium was refreshed, and cells were transfected with AONs (for AONs used see table 2) using Lipofectamine 2000 (Invitrogen) according to manufacturer's instructions, in a 1:2 ratio of AON (in µg) and lipofectamine reagent (in µl). AON doses are calculated as final concentration in the culture medium. 24 hours after transfection, cells were sampled to quantify COCH transcript levels. To specifically investigate COCH transcript degradation, tetracycline induction of COCH expression was terminated by replacement of the culture medium with Optimem (Sigma Aldrich) prior to transfection. In these experiments, cells were sampled 5 hours after transfection.

TABLE 2

AONs tested

| AON | SEQ ID NO | Target | Sequence |
|---|---|---|---|
| X1a | 27 | c.151C > T | CCUGAGCAGAGGACAUCUGC |
| X1b | 28 | c.151C > T | CCCUGAGCAGAGGACAUCUG |
| X1c | 29 | c.151C > T | CCCCUGAGCAGAGGACAUCU |
| X1d | 30 | c.151C > T | UGAGCAGAGGACAUCUGCUU |
| X1e | 31 | c.151C > T | AGCCCCUGAGCAGAGGACA |
| X1f | 32 | c.151C > T | GCAGCCCCUGAGCAGAGGA |
| X1g | 33 | c.151C > T | CUGAGCAGAGGACAUCUGCU |
| X1h | 34 | c.151C > T | CCCUGAGCAGAGGACAUCUG |
| X3a | 35 | c.436 + 368_436 + 369dupAG | AUAGCUAGACCUCUGUCUAA |
| X3b | 53 | c.436 + 368_436 + 369dupAG | UCAUAGCUAGACCUCUGUCU |
| X3c | 54 | c.436 + 368_436 + 369dupAG | AUCAUAGCUAGACCUCUGUC |
| X3d | 55 | c.436 + 368_436 + 369dupAG | CAUCAUAGCUAGACCUCUGU |
| X3e | 56 | c.436 + 368_436 + 369dupAG | AGCUAGACCUCUGUCUAAAA |
| X3f | 57 | c.436 + 368_436 + 369dupAG | UAGCUAGACCUCUGUCUAAA |
| X4a | 50 | c.263G > A | AUAGACUCGUACAGGUUCCC |

Delivery of RNase H1-Dependent Antisense Oligonucleotides to Transiently Transfected Cells.

Regular HEK-293T cells were cultured in high glucose DMEM-AQ (Sigma Aldrich, Saint Louis, USA) supplemented with 10% Fetal Calf Serum, 1% Penicillin/Streptomycin and 1 mM Sodium Pyruvate. Cells were seeded in 12-well plates in a volume of 1 ml/well, to reach a confluency of ±70% on the day of transfection. Prior to transfection, culture medium was replaced with 1 ml fresh medium. Cells were transfected with a combination of 500 ng of plasmid expressing c.263G>A COCH (SEQ ID NO: 2), and an allele-specific AON X4a (SEQ ID NO: 50) to a final concentration of 250 nM in the culture medium. Transfections were conducted with polyethylenimine (PEI) as described in Roosing et al, 2014. 24 hours post-transfection, cells were sampled for RNA analysis and quantification of COCH transcript levels.

RNA Extraction and cDNA Synthesis

Total RNA was extracted from cells using Trizol Reagent (Invitrogen) according to manufacturer's instructions. First strand cDNA was generated using the iScript gDNA clear cDNA synthesis kit (Bio-Rad, Hercules, USA) using a fixed amount of RNA input (250 ng) in a 10 ul reaction volume. The obtained cDNA was diluted four times and used for transcript analysis.

Quantification of COCH Transcript Levels

Four microliters of diluted cDNA was used as input in an allele-specific TaqMan assay using primers 5'-GGA-CATCAGGAAAGAGAAAGCAGAT-3' (SEQ ID NO: 44) and 5'-CCCATACACAGAGAATTCCTCAAGAG-3' (SEQ ID NO: 45), a wildtype allele-specific VIC-labeled probe 5'-CCCCCTGGGCAGAG-3'(SEQ ID NO: 46) and a mutant allele-specific FAM-labeled probe 5'-CCCCCT-GAGCAGAG-3' (SEQ ID NO: 47). Abundance of mutant and wildtype COCH transcripts was calculated relative to the expression of the housekeeping gene RPS18, and normalized to TET-induced samples without AON treatment. Primers used to amplify RPS18 are 5'-ATA-CAGCCAGGTCCTAGCCA-3' (SEQ ID NO: 48) and 5'-AAGTGACGCAGCCCTCTATG-3' (SEQ ID NO: 49).

Results

Identification of Therapeutic Targets

Due to the non-haploinsufficiency mechanism of disease underlying DFNA9, blocking the transcription of or translation from the mutant allele has the potential to halt the progression of the disease. For the development of an antisense oligonucleotide-based therapeutic strategy, reliable discrimination between the mutant and the wildtype allele is of vital importance. Targeting the disease-causing mutation is a commonly used option to discriminate between alleles. However, the disease-causing mutations of DFNA9 are mostly single nucleotide substitutions, leaving little room to design a reliable and robust allele-specific therapy. We sequenced the complete wildtype and mutant alleles of DFNA9 patients with the frequently occurring founder mutations c.151C>T and c.263G>A to identify additional mutant allele-specific variants that can used as targets for the development of antisense therapy. This resulted in the identification of 12 additional intronic variants in cis with the c.151C>T mutation in COCH (FIG. 1A; Table 3), with an allele frequency between 0.04 and 0.1 in the non-Finnish European population according to the GnomAD database (https://gnomad.broadinstitute.org/).

TABLE 3

Allele-specific variants in the c.151C > T mutant COCH haplotype with an allele frequency <0.1.

| location | position | identifier | c. HGVS | AA change | freq. GnomAD Eur non-Finnish |
|---|---|---|---|---|---|
| e4 | 69 (151) [chr14: g.31346846 (GRCh37/hg19)] | rs28938175 | c.151C > T | Pro51Ser | n.a. |
| i4 | −239 [chr14: g.31347778 (GRCh37/hg19)] | rs143609554 | c.240 − 239A > T | | T: 0.05378 |
| i6 | +185 [chr14: g.31348876 (GRCh37/hg19)] | rs7140538 | c.436 + 185G > T | | T: 0.05481 |
| i6 | +370/2 bp [chr14: g.31349060_31349061 (GRCh37/hg19)] | rs10701465 | c.436 + 368_436 + 369dupAG | | dupAG: 0.05476 |
| i8 | +1186 [chr14: g.31351126 (GRCh37/hg19)] | rs186627205 | c.629 + 1186T > C | | C: 0.05432 |
| i8 | +1779/1 bp [chr14: g.31351719 (GRCh37/hg19)] | rs200080665 | c.629 + 1779delC | | delC: 0.05399 |
| i8 | +1807/1 bp [chr14: g.31351747 (GRCh37/hg19)] | rs368638521 | c.629 + 1807delA | | n.a. |
| i8 | +1809 [chr14: g.31351749 (GRCh37/hg19)] | rs554238963 | c.629 + 1809A > C | | C: 0.0994 (dbSNP) |
| i8 | +1812 [chr14: g.31351752 (GRCh37/hg19)] | rs184635675 | c.629 + 1812A > T | | T: 0.05427 |
| i8 | −208 [chr14: g.31353551 (GRCh37/hg19)] | rs2295128 | c.630 − 208A > C | | C: 0.05253 |

TABLE 3-continued

Allele-specific variants in the c.151C > T mutant COCH haplotype with an allele frequency <0.1.

| location | position | identifier | c. HGVS | AA change | freq. GnomAD Eur non-Finnish |
|---|---|---|---|---|---|
| i9 | −304 [chr14: g.31354296 (GRCh37/hg19)] | rs28362773 | c.734 − 304T > G | | G: 0.07141 |
| i11 | +9 [chr14: g.31355527 (GRCh37/hg19)] | rs17097458 | c.1477 + 9C > A | | A: 0.05364 |
| i11 | −1474/1 bp [chr14: g.31357348 (GRCh37/hg19)] | rs398024681 | c.1478 − 1474delT | | n.a. |

Antisense Oligonucleotides Complementary to Sequences Containing Allele-Discriminating Variants Significantly Reduce Mutant COCH Transcript Levels.

Figure 2B:
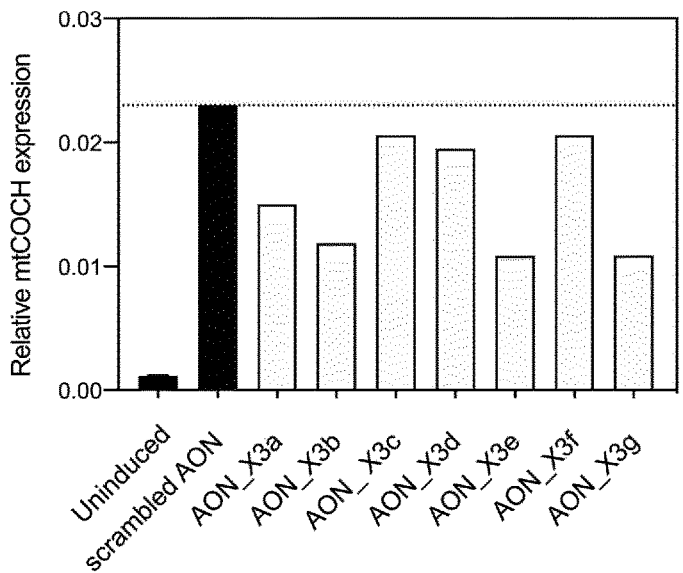
Figure 3A:
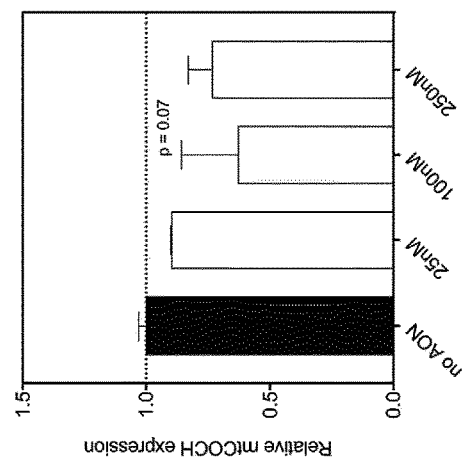
FIG. 3: Concentration series of identified effective AONs. A) AONs were delivered in two (X1b, left panel) or three (X1e (middle panel) and X3a (right panel)) different concentrations. A significant reduction in COCH transcript levels was observed upon transfection of AON_X1b and X1e as compared to untransfected controls. Bars represent the mean mutant COCH expression relative to RPS18. P<0.01, *P<0.001, One-Way ANOVA with Tukey's multiple comparison test. B) Gapmer compositions of AONs X1e (left panel), X1f (middle panel) and X3a (right panel) were delivered in three different concentrations. A significant reduction in COCH transcript levels was observed upon transfection of all three AONs in gapmer composition as compared to untransfected controls. Bars represent the mean mutant COCH expression relative to RPS18. P<0.01, *P<0.001, One-Way ANOVA with Tukey's multiple comparison test.
Figure 3A:
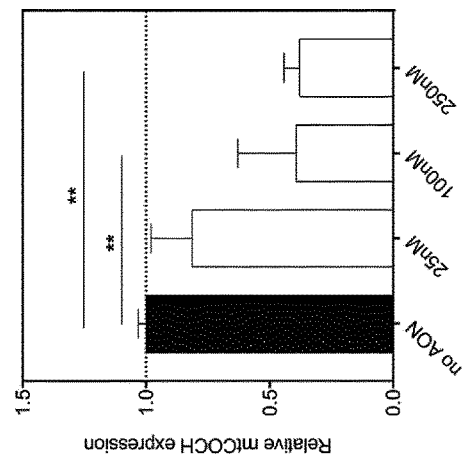
Figure 3A:
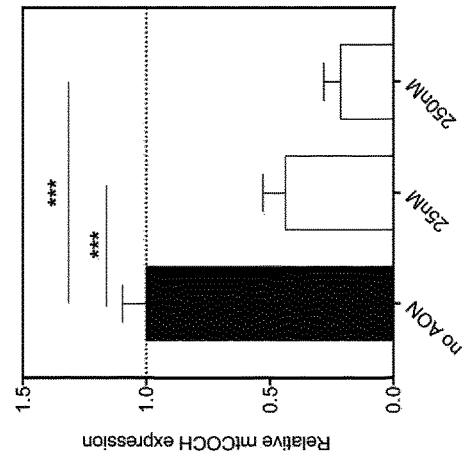
Figure 3B:
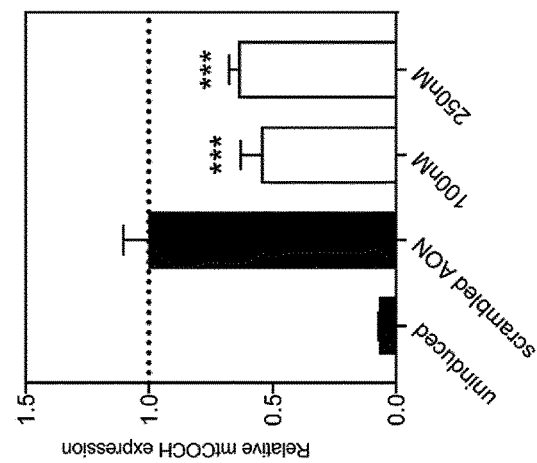
Figure 3B:
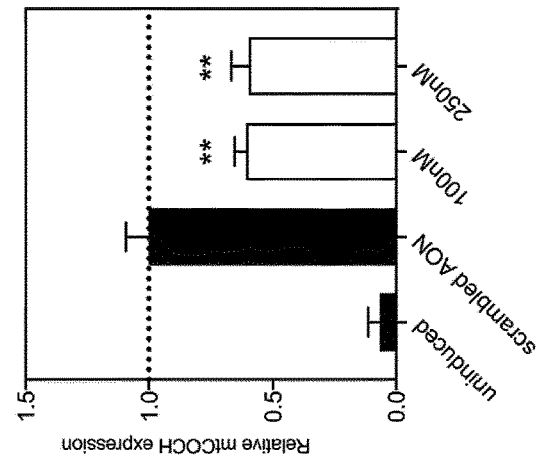
Figure 3B:
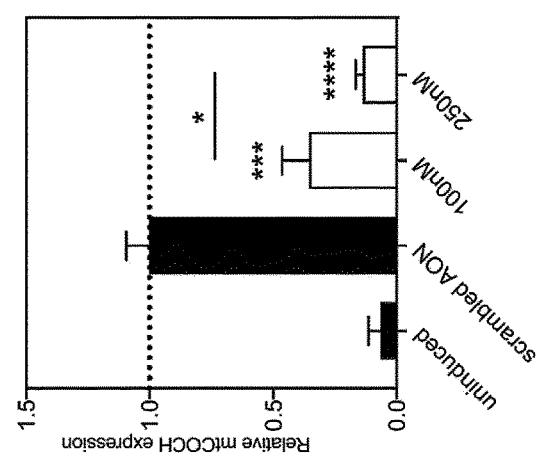

As frequently-used patient-derived cell models, such as fibroblasts, hardly express the COCH gene, we generated stable transgenic cell models in which mutant or wildtype COCH alleles can be expressed using a tetracycline-inducible promoter. To identify AONs with the ability to degrade mutant COCH transcripts, cells were seeded in multi-well plates, and subsequently treated with tetracycline to induce COCH expression. Next, cells were treated with different AONs complementary to the c.151C>T mutation and flanking sequence (target X1, FIG. 2A, left panel). In this initial screen to identify the optimal AON sequences, a single well was transfected per AON sequence, with the exception of AON_X1b. Except for AON_X1a, all AONs directed against target X1 resulted in a reduction of mutant COCH transcript levels. In a separate experiment, the potential of AON X3a (complementary to the c.436+368_436+369 dupAG variant and surrounding sequence on the c.151C>T COCH allele; target X3) to degrade mutant COCH transcripts was analyzed (in triplo) using a dose of 250 nM (FIG. 2A, right panel). Transfection of cells with AON X3a indeed also resulted in a reduction of c.151C>T COCH transcript levels. Upon the observed reduction of c.151C>T COCH transcript levels after treatment with AON X3a, we investigated a mixture of gapmer and non-gapmer AON sequences directed against the c.436+368_436+369 dupAG variant for their ability reduce c.151C>T COCH transcript levels (FIG. 2B). In particular, treatment of cells with AONs X3a, X3b, X3e and X3g resulted in a decrease in c.151C>T COCH transcript levels.

The ability of AON X1b, X1e and X3a to induce the degradation of c.151C>T-containing COCH transcripts was subsequently investigated using an AON concentration of 25, 100 and 250 nM (FIG. 3). Quantitative analyses revealed that AON X1b and X1e were able to degrade c.151C>T COCH transcripts in a dose-dependent manner. For AON X3a, a mild decrease of c.151C>T COCH transcript levels was observed at a concentration of 100 nM (p=0.07). In FIG. 3A, AON X1b (left panel), but not AONs X1e (middle panel) and X3a (right panel) had a gapmer composition. Therefore, we next investigated the effect of AON sequences X1e and X3a in gapmer composition (FIG. 3B) at concentrations of 100 and 250 nM. We furthermore included a third AON directed against the c.151C>T target (AON X1f). Quantitative analyses revealed that gapmer AON X1e was able to degrade c.151C>T COCH transcripts in a dose-dependent manner (FIG. 3B, left panel). In addition, gapmer AONs X1f and X3e also resulted in a significant decrease of c.151C>T mutant COCH transcripts compared to cells treated with a control AON. In contrast with AON X1e, the maximum reduction in mutant COCH transcript level appears to be already achieved at the lowest dose tested (FIG. 3B, middle and right panel).

To show that the AON molecules indeed increased degradation of COCH transcripts, and not interfered with the induction of COCH expression, a second experimental paradigm was used. Cells were seeded and subsequently treated with tetracycline to induce COCH expression. After 20 hours, tetracycline was washed away to stop the induction of COCH expression. From this moment onwards, COCH transcripts undergo natural breakdown at a speed that can be increased by the delivery of AONs complementary to the target sequence. In this paradigm, we furthermore investigated the allele-specificity of the different AONs.

Figure 4A:
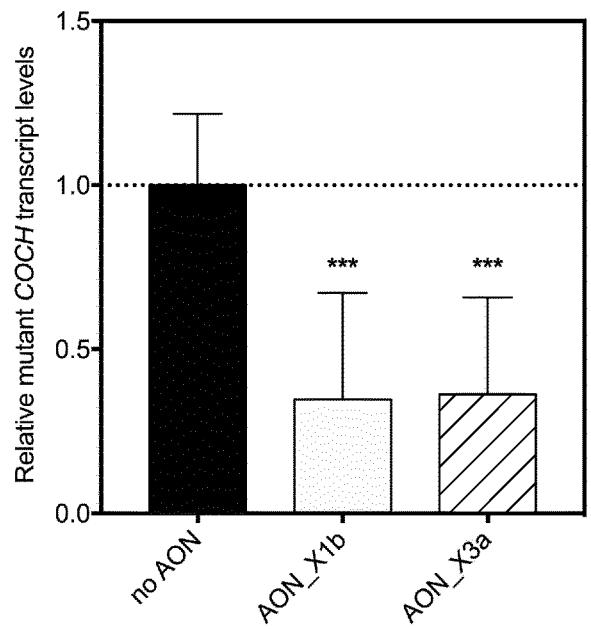
FIG. 4: AON treatment of mutant and wildtype COCH-expressing T-REx 293 cells. A) AON treatment of mutant COCH expressing cells results in a significant reduction of mutant COCH transcripts. No difference in effect size is observed after supplementing cells with AON_X1b (targeting the region containing the c.151C>T mutation (white bar)) or AON_X3a (targeting the region containing the c.436+368_436+369 dupAG variant (grey bar)), both residing on the same allele. B) AON treatment of wildtype COCH-expressing cells shows that both the AON_X1b and AON_X3a do not affect wildtype COCH transcript levels. Both graphs depict the result of 3 replicate experiments (N=7-11 measurements). ***P<0.001, One-Way ANOVA with Tukey's multiple comparison test.
Figure 4B:
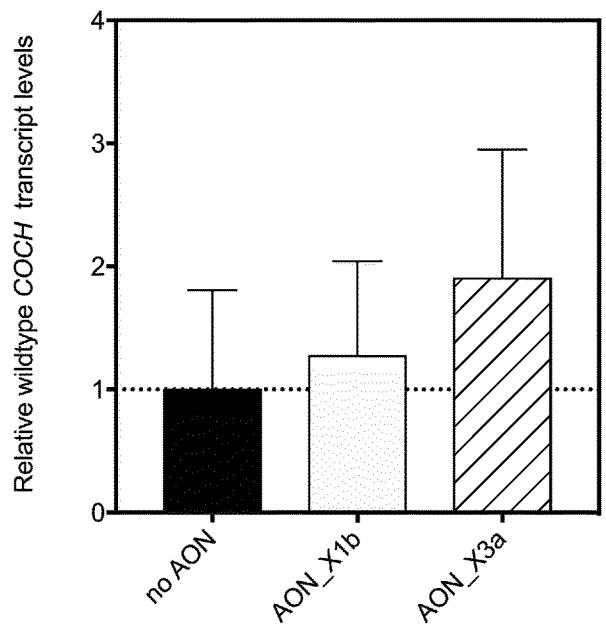

Upon transfection in the mutant (c.151C>T) COCH-expressing T-REx 293 cells, AON_X1b (directed at the region containing the c.151C>T mutation) and AON_X3a (directed at the region containing the c.436+368_436+369 dupAG variant), both resulted in a significant reduction of mutant COCH transcript levels as compared to untreated cells. Using this experimental setup, no difference in effect size between AONs directed at the different targets was observed. Furthermore, both AONs show a high binding specificity for the c.151C>T-mutant COCH allele, as no decrease in wildtype COCH transcript levels is observed when wildtype COCH-expressing T-REx 293 cells were transfected with these AONs (FIG. 4B).

Figure 5A:
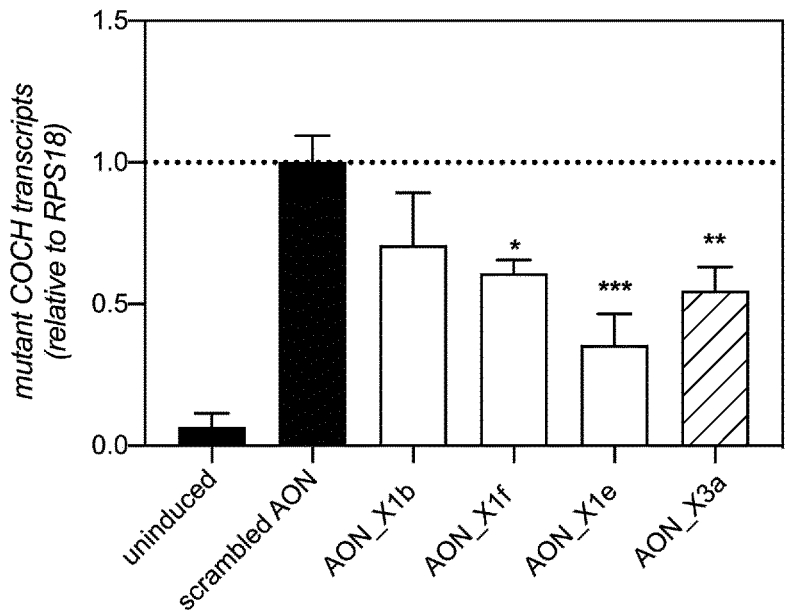
FIG. 5: AON treatment of mutant and wildtype COCH-expressing T-REx 293 cells with continuous induction of COCH expression. A) AON treatment of mutant COCH expressing cells with gapmer AONs X1e, X1f and X3a results in a significant reduction of mutant COCH transcripts. B) AON treatment of wildtype COCH-expressing cells shows that none of the four AONs affect wildtype COCH transcript levels. Bars represent the average of 3 replicates, *P 0.05, P 0.01, *P<0.001, One-Way ANOVA with Tukey's multiple comparison test.
Figure 5B:
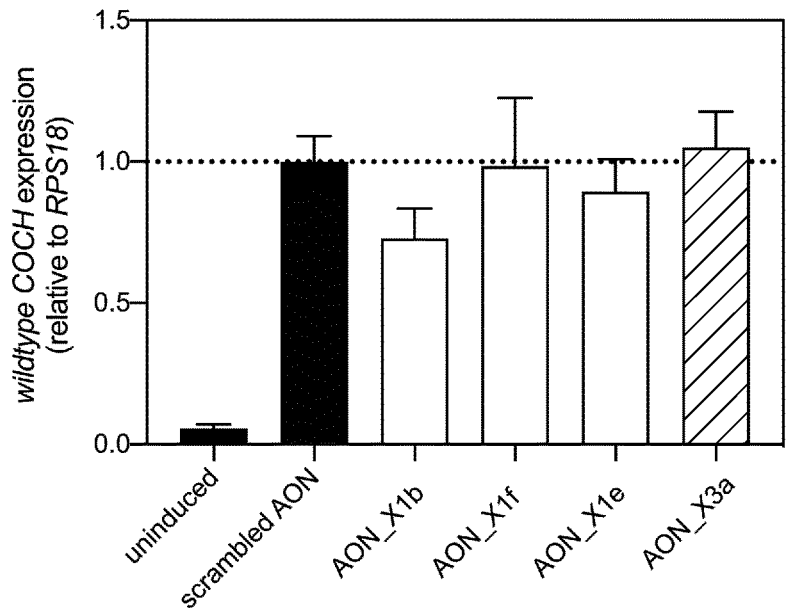

Thus, these data nicely show that the AONs induce increase breakdown of c.151C>T COCH transcripts. We additionally, investigated the effects of selected AONs under continuous COCH transcription (FIG. 5). This situation better resembles the continuous expression of COCH in the human cochlea. Transfection of c.151C>T mutant COCH expressing cells with 100 nM AONs X1e, X1f and X3a resulted in a significant decrease of c.151C>T COCH transcripts as compared to control transfected cells (FIG. 5A). Transfection of the same cells with AON X1b, effective under halted COCH transcription (FIG. 4), resulted in a non-significant decrease of mutant COCH transcripts. Likely higher concentrations of AON X1b, are required to induce as significant decrease in mutant COCH transcript levels under continuous COCH transcription. Transfection of the same AONs in cells expressing wildtype COCH transcripts, had no significant effect on the levels of wildtype COCH transcripts as compared to control transfected cells, indicating specificity for the mutant allele for these AONs (FIG. 5B).

The fact that AON_X3a targets an intronic variant that is specific to the c.151C>T mutant COCH allele, and AON_X1f targets the mutation itself, have result in a similar decrease in mutant COCH transcripts, indicates that targeting mutant allele-specific variants is also a powerful method to decrease mutant COCH transcript levels.

Figure 6:
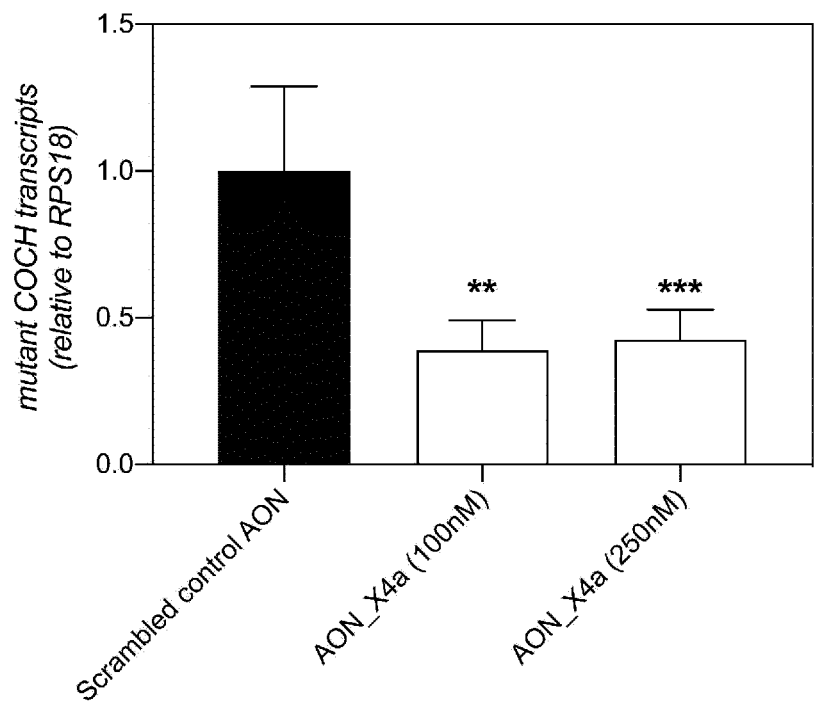
FIG. 6. AON treatment of HEK-293T cells transiently transfected with c.263G>A mutant COCH plasmids. AON_X4a treatment of c.263G>A mutant COCH expressing cells, resulting from a transient transfection, resulted a significant decrease in mutant COCH transcripts at both 100 nM and 250 nM concentrations. Bars represent the average of 3-6 replicates, P 0.01, *P<0.001, One-Way ANOVA with Tukey's multiple comparison test.

Finally, we investigated the effect of AONs specific to the c.263G>A mutant COCH allele. The c.263G>A mutation, was discovered as a founder mutation in the America population, and also leads to DFNA9. We co-transfected plasmids encoding c.263G>A mutant COCH with AON_X4a in regular HEK-293T cells. AON_X4a was able to induce a significant decrease in c.263G>A mutant COCH transcripts (FIG. 6).

CONCLUSION

Overall, our results demonstrate that the delivery of antisense oligonucleotides can be used to specifically decrease the levels of mutant COCH transcripts. DFNA9 is a dominantly inherited disease, where the protein encoded by the mutant COCH gene interferes with normal function of the cochlea and the vestibular organ. DFNA9 patients all have a single healthy copy of the COCH gene that, in absence of mutant cochlin proteins, is sufficient for normal function of the inner ear (Robertson et al., 2008; JanssensdeVarebeke et al., 2018). Therefore, AONs according to the invention can be used in the treatment of human subjects suffering from hearing impairment and/or vestibular dysfunction due to mutations in the COCH gene.

REFERENCES

Bom S J H, Kemperman M H, Huygen P L M, Luijendijk M W J, Cremers C W R J. Cross-sectional analysis of hearing threshold in relation to age in a large family with cochleovestibular impairment thoroughly genotyped for DFNA9/COCH. Ann. Otol. Rhinol. Laryngol. 2003 March; 112(3):280-6.

Crosby J R, Zhao C, Jiang C, Bai D, Katz M, Greenlee S, et al. Inhaled ENaC antisense oligonucleotide ameliorates cystic fibrosis-like lung disease in mice. J. Cyst. Fibros. 2017 November; 16(6):671-80.

de Kok Y J, Bom S J, Brunt T M, Kemperman M H, van Beusekom E, van der Velde-Visser S D, et al. A Pro51Ser mutation in the COCH gene is associated with late onset autosomal dominant progressive sensorineural hearing loss with vestibular defects. Hum Mol Genet. 1999 February; 8(2):361-6.

Gallant E, Francey L, Fetting H, Kaur M, Hakonarson H, Clark D, et al. Novel COCH mutation in a family with autosomal dominant late onset sensorineural hearing impairment and tinnitus. Am J Otolaryngol. 2013 May; 34(3):230-5.

Ikezono T, Omori A, Ichinose S, Pawankar R, Watanabe A, Yagi T. Identification of the protein product of the Coch gene (hereditary deafness gene) as the major component of bovine inner ear protein. Biochim Biophys Acta. 2001 Mar. 26; 1535(3):258-65.

JanssensdeVarebeke SPF, Van Camp G, Peeters N, Elinck E, Widdershoven J, Cox T, et al. Bi-allelic inactivating variants in the COCH gene cause autosomal recessive prelingual hearing impairment. Eur. J. Hum. Genet. Nature Publishing Group; 2018 Feb. 15; 23:42. PMCID: PMC5891501

Jones S M, Robertson N G, Given S, Giersch A B S, Liberman M C, Morton C C. Hearing and vestibular deficits in the Coch(−/−) null mouse model: comparison to the Coch(G88E/G88E) mouse and to DFNA9 hearing and balance disorder. Hear. Res. 2011 February; 272(1-2):42-8. PMCID: PMC3039082

Jung J, Yoo J E, Choe Y H, Park S C, Lee H J, Lee H J, et al. Cleaved Cochlin Sequesters *Pseudomonas aeruginosa* and Activates Innate Immunity in the Inner Ear. Cell Host & Microbe. Cell Press; 2019 Apr. 10; 25(4):513-6.

Kommareddi P K, Nair T S, Raphael Y, Telian S A, Kim A H, Arts H A, et al. Cochlin isoforms and their interaction with CTL2 (SLC44A2) in the inner ear. J. Assoc. Res. Otolaryngol. 2007 December; 8(4):435-46. PMCID: PMC2538338

Kordasiewicz H B, Stanek L M, Wancewicz E V, Mazur C, McAlonis M M, Pytel K A, et al. Sustained therapeutic reversal of Huntington's disease by transient repression of huntingtin synthesis. Neuron. 2012 Jun. 21; 74(6):1031-44. PMCID: PMC3383626

Liang X-H, Sun H, Nichols J G, Crooke S T. RNase H1-Dependent Antisense Oligonucleotides Are Robustly Active in Directing RNA Cleavage in Both the Cytoplasm and the Nucleus. 2017 Sep. 6; 25(9):2075-92. Retrieved from: http://linkinghub.elsevier.com/retrieve/pii/S1525001617302629

Nagy I, Trexler M, Patthy L. The second von Willebrand type A domain of cochlin has high affinity for type I, type II and type IV collagens. Febs Lett. John Wiley & Sons, Ltd; 2008 Dec. 10; 582(29):4003-7.

Robertson N G, Cremers C W R J, Huygen P L M, Ikezono T, Krastins B, Kremer H, et al. Cochlin immunostaining of inner ear pathologic deposits and proteomic analysis in DFNA9 deafness and vestibular dysfunction. Hum Mol Genet. 2006 Apr. 1; 15(7):1071-85.

Robertson N G, Jones S M, Sivakumaran T A, Giersch A B S, Jurado S A, Call L M, et al. A targeted Coch missense mutation: a knock-in mouse model for DFNA9 late-onset hearing loss and vestibular dysfunction. Hum Mol Genet. Oxford University Press; 2008 Nov. 1; 17(21):3426-34. PMCID: PMC2566528

Robertson N G, Lu L, Heller S, Merchant S N, Eavey R D, McKenna M, et al. Mutations in a novel cochlear gene cause DFNA9, a human nonsyndromic deafness with vestibular dysfunction. Nat. Genet. 1998 November; 20(3):299-303.

Vickers T A, Crooke S T. Antisense Oligonucleotides Capable of Promoting Specific Target mRNA Reduction via Competing RNase H1-Dependent and Independent Mechanisms. Buratti E, editor. PLoS One. 2014 Oct. 9; 9(10):e108625.

Wang L, Kempton J B, Brigande J V. Gene Therapy in Mouse Models of Deafness and Balance Dysfunction. Front Mol Neurosci. 2018; 11:300. PMCID: PMC6123355

Yao J, Py B F, Zhu H, Bao J, Yuan J. Role of protein misfolding in DFNA9 hearing loss. Journal of Biological Chemistry. American Society for Biochemistry and Molecular Biology; 2010 May 14; 285(20):14909-19. PMCID: PMC2865277

Roosing, S., Lamers, I. J. C., de Vrieze, E., van den Born, L. I., Lambertus, S., Arts, H. H., et al. Disruption of the basal body protein POC1B results in autosomal-recessive cone-rod dystrophy. American Journal of Human Genetics; 2014, 95(2), 131-142. PMCID: PMC4129401

The invention claimed is:

1. An antisense oligonucleotide moiety for the specific degradation of a mutated COCH transcript that binds to and/or is complementary to a polynucleotide part within the nucleotide sequence as set forward in SEQ ID NO: 1 or in SEQ ID NO: 2, wherein the polynucleotide e part has a nucleotide sequence selected from the group consisting of SEQ ID NO: 3, 4, 5, 6, 7, 8, 9, 10, 11, 12, 13, 14, 15, 16, 17, 18, 19, 20, 21, 22, 23, 24, 25, and 26.

2. An antisense oligonucleotide for the degradation of a mutated COCH according to claim 1, wherein the antisense oligonucleotide comprises an RNA residue, a DNA residue, and/or a nucleotide analogue or equivalent, preferably wherein the antisense oligonucleotide comprises both RNA and DNA residues.

3. An antisense oligonucleotide for the degradation of a mutated COCH according to claim 1, wherein the antisense nucleotide is a gapmer.

4. An antisense oligonucleotide for the degradation of a mutated COCH according to claim 1, wherein the antisense oligonucleotide has a length of from about 8 to about 40 nucleotides, preferably from about 10 to about 40 nucleotides, more preferably from about 14 to about 30 nucleotides, more preferably from about 16 to about 24 nucleotides, such as 16, 17, 18, 19, 20, 21, 22, 23 or 24 nucleotides.

5. An antisense oligonucleotide for the degradation of a mutated COCH according to claim 1, wherein said antisense oligonucleotide comprises or consists of an oligonucleotide with the sequence as set forward in SEQ ID NO: 2%-28, 29, 30, 31, 32, 33, 34, 35, 50, 53, 54, 55, 56 or 57.

6. An antisense oligonucleotide for the degradation of a mutated COCH according claim 1, comprising a 2'-O alkyl phosphorothioate modified nucleotide, such as a 2'-O-methyl modified ribose, a 2'-O-ethyl modified ribose, a 2'-O-propyl modified ribose, and/or substituted derivatives of these modifications such as halogenated derivatives.

7. A pharmaceutical composition comprising an antisense oligonucleotide for the degradation of a mutated COCH according to-claim 1 and further comprising a pharmaceutically acceptable excipient.

8. A pharmaceutical composition according to claim 7, wherein the pharmaceutical composition is for administration into the cochlea.

9. A method of treatment of a COCH related disease or condition requiring the degradation of mutated COCH (pre) mRNA in a subject in need thereof, comprising administration of an antisense oligonucleotide for the degradation of a mutated COCH as defined in claim 1.

10. The method according to claim 9, wherein the COCH related disease or condition is a condition resulting in hearing impairment and/or vestibular dysfunction.

11. The method according to claim 9, wherein the COCH related disease or condition is a is a vestibulo-cochlear disorder.

12. The method according to claim 9, wherein the COCH related disease or condition is DFNA9.

* * * * *

SEQUENCE LISTING

<160> NUMBER OF SEQ ID NOS: 57

<210> SEQ ID NO 1
<211> LENGTH: 16083
<212> TYPE: RNA

<213> ORGANISM: Homo sapiens

<400> SEQUENCE: 1

| | | | | | |
|---|---|---|---|---|---|
| gcggccgcgg | gggccuugcc | uuccgcacuc | gggcgcagcc | ggguggaucu | cgagcaggug | 60 |
| cggagcccg | gcggcgggc | gcggugcga | gggaucccug | acgccucugu | cccuguuucu | 120 |
| uugucgcucc | cagccugucu | gucgucguuu | uggcgccccc | gccucccgc | ggugcgggu | 180 |
| ugcacaccga | uccugggcuu | cgcucgauuu | gccgccgagg | cgccucccag | accuagaggg | 240 |
| gcgcuggccu | ggagcagcgg | gucgucugug | uccucucucc | ucugcgccgc | gcccggggau | 300 |
| ccgaagggug | cggggcucug | aggaggugac | gcgcggggcc | uccgcaccc | uggccuugcc | 360 |
| cgcauucucc | cucucucca | ggugugagca | gccuaucagu | caccaugucc | gcagccugga | 420 |
| ucccggcucu | cggccucggu | gggugcgcgc | cccucacgac | cccggccccu | ugcuccgcug | 480 |
| gguggaggcu | ggagccagcc | cucacgcuuc | ucucuucgca | ggugugguc | ugcugcugcu | 540 |
| gccggggccc | gcgggcagcg | agggagccgg | ugagugggg | agcuggggug | cguccaggcg | 600 |
| gucgcagggg | cugagcacca | gcgggucuaa | gcggacucu | gauccagccc | cuggggcuuc | 660 |
| agcccgaccg | ccugaggagg | aaggcgcgaa | gguugagccg | ccgcguggcg | cgccgcguu | 720 |
| aaccccugca | gccgaucugc | uccugcucac | cuguuucucc | cauggguagg | ggccccuggg | 780 |
| guccaguggg | gggacguucu | ccaagagcac | uaggaagaag | gccuccucca | ggcccacca | 840 |
| cagcccaga | cccgggccc | gcugagcgcc | ggcagcagga | ggucgaggaa | ggaggacucc | 900 |
| uugagccuca | ccgaggagcg | caccaguccu | gggcucugcu | gcguuggggg | guggaggaga | 960 |
| agccgcccag | acccgacuuc | agguugccgu | agccgagaga | gagggaggcg | aacgucgcug | 1020 |
| ucccaccuug | uuugacucgc | uagcuauguu | ucaggugua | accccauaa | ucagaagcac | 1080 |
| ucgcggucuc | acucuacacg | cuagagaguu | uaaaaaguuu | guaccacgug | uagaggagccg | 1140 |
| gguaugggug | ugggguuugg | uguauuuucc | aguguaaaag | gcaacgcuuu | ccuaagagcu | 1200 |
| accguuuguu | uuccuugaaa | guaggaauga | ggguuaagua | ucccucaugg | cuguauucu | 1260 |
| cccgcucuac | uuaacaaaag | ucagguguucg | caacuaaagg | cggucggucu | uggcaccgga | 1320 |
| uuccgaugcc | gccccaucu | cagcggaaaa | ugggaggaag | gauuaaggcu | guuugaugau | 1380 |
| agguagugagg | cuguuuaggg | guaaggauuu | uaaccucuca | gcucuucuaga | cugcuucaga | 1440 |
| gcuaagaaau | gggcauugcg | ccugcauccu | uccuucucuu | ccauggaaug | uaagguaccu | 1500 |
| gucaccacaa | agggcacaga | ggagggugcu | ugucacaggc | aaguacucca | guuggacagu | 1560 |
| auggccagaa | aguauuccuc | ugccuuggaa | aaaaaagguu | uuaaaauua | auauauguuu | 1620 |
| uaaaaagguu | uggauaacua | caacuucca | uguugaaaa | auagcauuua | auaacauuaa | 1680 |
| ucucaauuua | guaucgacag | uaaauucaca | aauuaacaug | uuguauuaug | uuacuuguu | 1740 |
| acuuguugcc | aagagcuugu | cucuuccuag | caucauuuau | aguaaaaacu | gauucuuugu | 1800 |
| uagguugaca | guguaaaacu | ugagaauauu | aacagugcuu | ucuaaaaaug | cauccgcugc | 1860 |
| uugauaaauc | ucacuggaca | gaucuggagc | agaaauaaauc | agguucaauu | aagauaaaaa | 1920 |
| ugcuguauuc | ugaagggauu | cacuuuucug | uuuucuguucc | uucgggaguu | guagaauguu | 1980 |
| guuugggcaa | auuaacccca | cggcuuuaau | uuucucaucu | auaaaaugaa | caucaaguu | 2040 |
| agauaacuuu | cugugaaucu | aagcaucuuu | uuguuggcuu | ccuaaugug | ugaguuuaag | 2100 |
| gaucugcauu | uguaggcuaa | cuaggauaaa | uggccuaug | aaggaaagga | uggcuuugau | 2160 |
| uugugcacau | gucaugaaaa | auguuccaca | aaggcucaau | ccagauuuac | uaucuuuacc | 2220 |
| ucaagcaacu | guguacauag | cgucaucaaa | guugagauuu | aaaaauuuuu | uuuuucuuc | 2280 |

-continued

```
uggagacaag aucuuauucu guaacccagg auggagugca gugaugcaau cauagcucau    2340
ugcaagcuug aacuccuggg cucaagcaau ccucccaccu cagccucucc aguggcggag    2400
aguacaggca ugcaccacca cgugugggcca uuuaaaaaaa auuuuuuuuu uuuagaagag   2460
augaggucuu gcuauguugu ccagacuggu cuugaccucc uggacucaag caaauccucu    2520
ugucuuggcc ugcuaaagug cugggauuau aggcaugagu caccacgccc agccaagauu    2580
uuuuauauuu cuauaauuaa uauuaaauga cuuuuauuuu cuaguucaga uauaguucca    2640
auuauguauu uccaaccugg uuaagaacug agaagccagg cacaguggca caccuguaau    2700
cccagcuacu agggaguugg agguggauca cuugagcucg ggaauuugag ccuagcuugg    2760
gcaacuuggc gagucccau uucaaaaaca aaacgaaau aaaaacccag aacuuucaca      2820
uuagacuuuu auaguggcug gggacuauau uaaauuggaa aacaaccuug uggcuugcca    2880
aaaucuggaa ugguauggaa gggauauauaa gucaauaguc auaacuagaa guguagaaau   2940
uaggaaagua aaacuuaaau cucacacugu agucucccca ccacuaugcc ccaagaaguc    3000
cuaagaaugc uuacaauauu aucuccuuuu ucuucagcuc ccaugcuau cacauguuuu     3060 accagaggcu uggacaucag gaaagagaaa gcagaugucc ucugcucagg gggcugcccu    3120
cuugaggaau ucucugugua ugggaacaua guauaugcuu cuguaucgag cauaugugggg   3180 gcugcugucc acagguaagc ccaaacacac cagggguggga gagaaaugca gacgugauua   3240
uuuccuuucc ugcuuuaccc aucuggaucc cuuccucccc ugcauucuuu cuuuuguugc    3300
cauuguggcc acagaaaaug gauauauuuu cacgguucuc cuggauauac uugaaacacc    3360
aaauacacau ggaaagcuuu cugacaaaag gcaaauagca uuaccucuug auggcuagau    3420
ugcuaugauu ccaaaacauu ccuaaucaug ugauauauua cugaguuauu acuaugugcc    3480
accuauuguu uuaacuucca ccacaacucu acaagguagg uagaauuuua cuccaguuac    3540
agaugaagaa acugaacuca gagaguugc aaguaucuug cccaagguga cuauuguuag    3600
caagugccau gcuauccugu aguagaauag ccaguauaau acuucuaaaa aaauucaguc   3660
caaaggcaug uagcuaaagu gaguaucuua ggaaaauugu uggugcucu gaauuucuaa    3720 guugugggua augggauauu acaaaugugu ucuuaucaac acuuaagaag uucaacagca    3780
caaaaccauu uuuuuccagg caaauuuugu ucuuguguaa gcaaguuuuu aaaaggcuag    3840
cagcagcugg gaguggluggc ucacaccugu aaucccacca cuuugggagg cugaggcgga   3900
uggaccacuu gaggucagga guucgagacc uagccaacau ggugaaaccc ugucucuacu    3960
aaaaauacaa aaauuagcca gguauggugg ugcaugccug uaaucccagc uacuugggag    4020
gcugaggcag gagaaucucu ugaauccugg agguggaggu ugcagugagc cgagaucgcg    4080
ccacugcacu ccauccuggg cuacagagcg agacgccauc aaauaaauaa auaaauaaag    4140
cagaaucuuu agaugacuuc ccugaugagc uauuucuug auuaaucaaa gcaauagaua    4200
caacauggca cuauaaguca gugggaugcc cugaaaagu guggauagca ucucagcugc    4260
uauucuugug uuacaggga guaaucagca acucagggg accuguacga gucuauagcc     4320
uaccuggucg agaaaacuau uccucaguag augccaaugg cauccagucu caaaugcuuu   4380
cuagaugguc ugcuucuuuc acaguaacua guagguauaa uuauuguucu cauucuguaa    4440
uauucuccca cccccccaaac guuuucugcu uuuuuuagcu cagccucuuu aaccuugaug   4500
gaaaaaccug ugaucaagac uaaagcugac cuauagaggu aaacuguagg uuagacuagg    4560
gggucaagua cccacugaag ccaaauuugg gugaauagaa gacaaucuua cugacagaug    4620
```

```
auggcaauag aaacuugaau uauuugcagu cagaaugccc ggacacuuac caaggaacug    4680
aaaaacuacu aaauacauuu uugaugaucc uuugaagaua uaauggauaa gcauuuggu     4740 ucucugaaac uagcaugcag caggauguuu guaacuacaa ucaccauuac ccauuacau     4800 uugucauugu agagagcucu aaauuagauu cauaauacuu ugguaaagaa ggaaaaggaa    4860
aaaaauaagc uuauuuuuau uuuaacagaa ggcaaaagua guacacagga ggccacagga    4920
caagcagugu ccacagcaca uccaccaaca gguaugaacu augaaaccua ucuccuaguu    4980
gcccggcaca gcauuuggaa guuaugaaua aacguguugu ugguagaagc uuucuuaaa     5040 gaaauuugau auuaaagaga aacaaagcaa auaccuuaag uuuacuggua uauuacauau    5100
ggaaacauuc auuaugugua uauuuuaaag acagguucuc acucuguugc ucaggcugga    5160
guacaguggu gcaaucauag cucacugcag ccuuaaacuc cuaggcucaa gcaaucuucu    5220
caccuuggcc uccugaguag gugguacuac aggcacaugc caccacaccc agccaauuuu    5280
uuugauuuuu aauuuuuuuu auuuuuauuu uuuuagacag aggucuagcu augaugccca    5340
ggcugguuuu gaacuccuga ccucaggcag uccucccacu ucagccuccc aaaguucagg    5400
gauuacaggc augagccacu gcacccagcc uaauaauucu cuaaaagucc uauuuucucc    5460
cagauuugau aaaccacgcc uaagaacugg ucaaaguacc augaacuucu aguuccauuu    5520
gcuucauuaa auuccuuuaa uuacugcacu gucaugugac uaaaaggaau gugugucuau    5580
uguaagaaau agccagggau cccuuuugu augacgaugg caguuuuaaa gucaaagaua    5640
uuaagaacau uaggauuuaa uguugaguuc ugccucaccc uguggguuug ggguauuaaa    5700
guccuggauu agggcauauc aaauauguag gccuacauac ugauuuguuu auuuguuggg    5760
ucauugcuuu cccuagucca gaaaauccug aggaaauuaa uuuuuuuaaa aaagucccuu    5820
caagaauggc acucuuugu uaugagccuuc uccccaugug gguuucugc uauguaacug     5880 ucuuccuuuu guuaaugcca agugcaucuu uuauuucagg uaaacgacua agaaaacac     5940 ccgagaagaa aacuggcaau aaagguaaga aucaagaucu ccauuuggga agguagcauu    6000
uucccucccu ccucuugaga cugcuaauga ggggacuggu uggugguuc gcagauugua     6060 aagcagacau ugcauuucug auugauggaa gcuuuaauau ugggcagcgc cgauuuaauu    6120
uacagaagaa uuuuguugga aaaguggcuc uaauguuggg aauuggaaca gaaggaccac    6180
augugggccu uguucaagcc agguaccaac cuuguuaaaa ugggagauuu aaaaaaaaaa    6240
uuauuuugua auugacacau aauaauuaua uauacuuaug ggguacauag ugauguuuuc    6300
auacauacaa uguauagugg ucaaaucaga guaauuagca uauccaucac cucaaacauu    6360
gaucauuucu uuguguugga uacauucaaa aucaaaugag gccggugca guggcucacg     6420 ccuguaauuc cagcacuuug gaggccaagu ggguguguggau caccugag ucaggaguu      6480 caaaaccagu cuggccaaca ugugaaacac cgucucuacu aaaaauacaa aaauuagcca    6540 gaugugugg caugcaccug uaauccuagc uacuugggag gcugaggcag gagaaucacu      6600
uggacucggg aggcagaggu acaaugagc cgagauugcca ccacugcacu ccagccuggg    6660
caacagugag acuaugucuc aaaaaaaaaa aaaaaaaga aaaaaaucaa augagaggag     6720
auuugaauga gucuugaaug augacaaaug aucaguucuu uuagggguua caugucaguu    6780
caguauaaac auuugaguua uggacacacu ggguucccaa acuguaaguu caggaucuaa    6840
gacugccugg gcagacugag uagaucugag ugccuccuuu uuggaauaaa agaauuuaga    6900
aaacugugug cuaucuauau aagaaccaga agguagacug agagauccug uugcuuuacac   6960 aagucacccuc ugcuuaucua cucugcucaa uuccuaauuu cucucuucug aaggaagaag   7020
```

```
cagugauaug ucuauuccac cucccuauuc uguuauucuu uuuagcucuu uccauauucu    7080
cuugguuggu gaucugaagc acgaccuuuc uauuuuauuc auuuaaaaau auuuauuaau    7140
ugcuggccag gugcgguggc ucacgccugu aauccagca cuuugggagg ccgaggcgga     7200
uggaucacgg ggucaggaga uugagaccau ccuggcuaac acggggaaac cccgucucua    7260
cuaaaaauac aaaaaaaaaa aauuagccgg gcguggpggc aggcgccugu agcccagcu    7320 acucgggagg cugaggcagg agaauggcgu gaacccagga gguggagcuu gcagugagcc    7380
aagaucgcgc cacugcacuc cagccugggc aacagagcaa gacucuguuu caaaaaauaa    7440
aaauaaaaau aaauaaauaa auaaauauuu auuuauuaau ugcuuuuaga aauagaauau    7500
gcucauuaua gaaagcuuga aaauacauag agcacaaaaa aagaaaugcu cuaaaucaua    7560
ugcccuagag auaaucacua uaaauugguu uuuuuuuuu uuuuuuuuu uuuuugagac      7620 ggaguuugc ucugucaccg aggcuggaau gcaauggcac gaucuuuguu cacuacaacc     7680
ucugccuccu ggauuuaagu gauucuccug ccuagccuc cugaguagcu gggaucacag     7740
gugugcacua cuacgccugg cuaauuuuug uauuuuuagu agagacaagg uuucaccaug    7800
uuggccagcc uggucucgag cuccugaccu caggugaucc accugccucg gccucccaaa    7860
gugcuaggau uacaggugug agcuaccacg ccuggccccu ucaguauuuu aaggaaauau    7920
uugacuguau uauuuuuuaa aaacucagac uauuaaaaau gcccugcauc cuguuuuuu    7980 cauccuuuag uauuuuuagc auuuucucuc ucaaauau ucaucaaaaa uauuucauaa     8040
uauucugcug caugauuagu cauucuuauu auuucuucac uacauuacac acuacacugu    8100
gaugaacauc cuuauaucau cuuugugccc aucucugauu auuucaucag guuagauuuc    8160
uaaaagugag guucgacuu aaagccucug auauaaauag ugaaauugag ccaugcacag     8220
uggcucaugc cuguagugcc agcugucag gaggcugagg ugugaggauc ucucaagccc     8280
aggaguucaa agcugcagug agcuaugaug gcaccacucu acccagccu ggacaacaga     8340 gaaagacccc aucucuaaaa aaacaaauaa auagcgaaau ugcuuccuag aaaggugaag    8400
uaguuuaaac uacuaucagc agugguaag guuguauaaa cagugcuauu acaaauauua    8460
auuuccauuu cauucuguu auuuuuuaca aguggcucug ucuuagauu agauagaauu      8520 uuuuuggcau gagaagaaaa uuuaacuguu uuaacauaau uuaaccauuu gucucucacc    8580
cuuaaaaaaa augguguuccu uguuucauug acuuauggua ucacuuuau accgaguuu     8640 gagcaagucu auuucuuuga uucauaugcu aauccuuaca uauuuuuuc uacgcugcuu     8700 ugauuaucac aguuuuauug cacauuuuaa cauccccauga ggcaaauucc ccugcaguac   8760
uuuuugucuu guacuuuuuu cugacuacuu ugacccaauu cuuuuugaag augaauucuu    8820
cauuaccuug uagacucaua caaaguuuug uaguuuucu guuuagaaa gaccauuaga      8880 auagguaaac caugucaagu uuauauguau guaagucaaa gaacagaaua uaucaaggau    8940 acaaaauga gacuauuuuc auaagucaua aucuggauau uugaaaagug accacaagug     9000
aaaagguuuu caacccauga aaucugauuu uaugacccaa uauccauca gguaugaug      9060 cagaaauaca gucaguguuc uacuucuccc ucaaaaaauc uugaauaaaa uggcuacuga    9120
uaaugcuaag aucuuuaauu uugcacuagg aaauacugac ucaucuagaa acuaaacaca    9180
acagauugug cuggguugu uuauacucaa aacggucucu gcugaacaca gaguaguuau     9240
auaaagguga gcuaaauuc cuuuaauauu aaauauagga aaugagaucu caaaacucuu     9300
acaauacaca uaauuuuaag gugcacaaau gucauugucu uuauaagaaa aacucaauau    9360
```

| | |
|---|---:|
| uguaacuuua uaauucauuu caccuuuguc ccuuuaaaaa aauguugacg gucacaucaa | 9420 |
| ugaaauuguu ucuccugaac agagagcucu gaguuaauag auccacacua cuuagagccu | 9480 |
| cugggguccc acacuggaac agacccuagu cucauaccca gccacuuccu cauuuaguuu | 9540 |
| agcuaccugg ugcccaacuc ugcggacuuc uguuaaaccc gaggcucuga gccaagcccg | 9600 |
| auuucaaguu cuccguauag uuuaggcaug gacuuugcag ccagacaacu ugaacuuaaa | 9660 |
| augcagcugu guuucaucag gcaaacuccc uaaaugcucu gagacucagu uucuucauuu | 9720 |
| acauaauugg gauaauucca accuuauaga gcuaugauga aaugagguuu uacaugucuu | 9780 |
| augcuuuugg cuuauuaccc agaauauaau acauccucaa uauggcaauu auuuguuaca | 9840 |
| ccucugaaau aucuccaaua auucaaguaa ggaugcaaug ccagcuuga cuauguacua | 9900 |
| uggaauuaag aaagaaacuu gugguuguc ugguuuaaaa acuguuuuuu aaggcaugua | 9960 |
| auguugcuua uuuuaccuuu uuaauucucc cugaauaaca uuucuuucu uccacucagu | 10020 |
| gaacauccca aaauagaauu uuacuugaaa aacuuuacau cagccaaaga uguuugguuu | 10080 |
| gccauaaagg aaguaggguu cagagggggu aauuccaaua cagguaagua gacuuugaua | 10140 |
| ccuggaugu aacauaggag aggguuauca gugaucagac auguaaaaca guauaugcu | 10200 |
| auuuauaug agcagauqug aaauccuccu ggaacugaaa ucuuggcuag gucugcauuu | 10260 |
| gaucaucuga gauaaauuuu caauuuauaa uggaaguaua ccaaagguguu gauauuucuu | 10320 |
| auuuaaaaa auauaaagca gguggauuua gaauucucau acauuggauu gacuagauau | 10380 |
| aacauuggag aaguaucucu uuguaaugcu aaaagaagu gaaaaucaac agacuuaucu | 10440 |
| aaugaaugca gauguggcag aaagaaugag uagcacuacc guugacucug aagagagacu | 10500 |
| ucuuagaggu acuaaucagu caccaaaggg cuacauagag agcacaugca uggaagggggg | 10560 |
| aaucaguuuu guguuucuaa cuggcgauug augugggggua aacaaaugug aggcuucuag | 10620 |
| gaggugggagg gggaacuaau auggcuugug aagauaaaua ggccugguag auaauuaaac | 10680 |
| uuucccagcu gaugcaucug uuacagaacu ggguucuaua uaauucuuuu uugugugccc | 10740 |
| cgcccccacug ccaguucuau auauaauucu uaaacuuugc agcaucaaau gcuacaggga | 10800 |
| aacagaaaug ugguuugagc aguggguaaag gcuauuuguu ugcuucuuuu ucaaauuuag | 10860 |
| gaaaagccuu gaagcauacu gcucagaaau ucuuacgggu agaugcugga guaagaaaag | 10920 |
| ggaucccccaa aguggugggug guauuuauug augguuggcc uucugaugac aucgaggaag | 10980 |
| caggcauugu ggccagagag uuuggugcuca auguauuuau aguuucugug gccaagccua | 11040 |
| ucccugaaga acugggggaug guucaggaug ucacauuugu ugacaaggua aaguggggag | 11100 |
| gguuaucuuc uguuacagug augggguauuc cauuuuggac cucuaagugc agugcugacu | 11160 |
| gcccucuuauc uagauuaacu ugaaacauuc aggauuuucc aguuuuuaag aagaaacaac | 11220 |
| uuuugauccu uuuggauauc uuuuaugugu cuccccccauu aggcugucug ucggaauaau | 11280 |
| ggcuucuucu cuuaccacau gcccaacugg uuuggcacca caaauacgu aaagccucug | 11340 |
| guacagaagc ugugcacuca ugaacaaaug augugcagca agaccuguua uaacucagug | 11400 |
| aacauugccu uucuaauuga uggcuccagc aguguuggag auagcaauuu ccgccucaug | 11460 |
| cuugaauuug uuuccaacau agccaagacu uuugaaaucu cggacauugg ugccaagaua | 11520 |
| gcugcuguac aguuuacuua ugaucagcgc acggaguuca guucacuga cuauagcacc | 11580 |
| aaagagaaug uccuagcugu caucagaaac auccgcuaua ugagugggug aacagcuacu | 11640 |
| ggugaugcca uuuccuucac uguugaaaau guguuuggcc cuauaaggga gagccccaac | 11700 |
| aagaacuucc uaguaauugu cacagauggg caguccuaug augauguccca aggcccugca | 11760 |

```
gcugcugcac augaugcagg uaaggucauu guucuuuaua ggagaaggga acagaaaaaa    11820
cgguucagug aauuuaggag uaaauaaaaa uuuaagcauu uauuucauua aacaaacacc    11880
uguggcuuua cccaauauua acuguuaaag cagcccuacu caucucauuc uacagauaag    11940
gaagcaaacu uccuggaaau gacauuucua guaaguggca aggccaagau ccaaacccag    12000
gcauucuggc uccagagugc acauccuaa ccacuguauu guugggagaa uugccaugag     12060
aaccauguca cauuaaggaa auaugcuuau acauauacaa uuaaggugcu cauauuuagc    12120
ucaaacuugg acuauaucuc caaauagcca gcuuauaacc uaccaugaau cugccauuca    12180
guaauuuauc cuaacuuucu uguguauaa cagguaauu gcucugucac caggcuggag      12240 ugcagugca uguagugagc uacaaccucc aacuauggg cucaagcaau ccuccugugu      12300
cagccuucca aauagcuagg acgacaggca caugccacug ccccuggcua auuuuuaaau    12360 uuuuuuggg agagacgggg gucucacuuu guugcccagg cugaucucaa acuccugggc     12420
ucaagcgauc cucacaccuu ggccuccaa agugcuggga uuacaggcau aagccaccac     12480
acccaacccu aacuuuuauu uuagucaagu uuugucuggc augaguuucc uaagauaagg    12540
ucucccauag acuuuaccua ucccaucaaa auuccuugg ccaggugcag uggcucacau     12600
cuguaauuca gcacuuuggg aggcugaggu gggcgggauc accugagguc aggaguucaa    12660
gaccagccgg gccaacaugg uaaaacccag ucucuauuaa aaauacaaaa auuagcuggg    12720 uguguaaca uacaccugua aucccagcua cucaggaggc ugaggcacga gaaucacuug    12780
aacccaggag gcagagguug caaugaacug agaucgugcc auguacucc agccugggcg     12840 acagagugag acucugucuc aaaaagaaaa aaaaaaaaa aaaaaaacuu uucccccc      12900 gcuuaagaua auaaaacac acucggugu auaaaaggg uauaagaagg guucuuucu       12960 uccucacccc agccuuaaua uuacuuuugg cacaggccuc guccugaag acauuaacgu     13020 aaugoguuag agaucaaaua ggccaacaaa aagcuaagau ucccuuucug aggauauaac    13080
ugagugacag gagggaagaa ucaauggacu uguuuuuuu aacacucuuc guaccucau      13140 uuucccuacu uaauuccaa ugacauaacc uuuuuccuuu cuacacauua guaccucugc     13200
caauguacuc acauauuuuu acagauacug augaaagauu auucuaaaa cagagaacac     13260 augcaauuua aguccacau cuagcuugua aaaaguauuu uuuauacauc agcaacuagc     13320 cuguaagua aagaccuguu uacuaucaua uccuuaaua cuuagcuuac ugaacuuaua      13380
guuaacagga uuguauucag gcuauaaagu gauuagguug auuaaaguuc aggaggcugg    13440
acuacaccaa uauugauucg ugaaaauuau cccuuagcga uauugaaagu ugcaaaagcc    13500
agaaaauagg guaggauuuu aggguagau cacaacaguu uuuauuuauu uucagggucu     13560
ugcucuguca cccaggcugg aguacagugg ugugauuauu uuuuuuuaa cuguaauuau    13620 augcugggcu ugagcuaaac aaucugaacu agaauguaga acugaaaaga agugaggaaa   13680
acugagggga aggaaaaaaa uauuugacu uuuuuuuuu uuaaccaggg agugagaguc     13740
aggaaaagga gacuggaaca auuggacauu guccaagua gcuuuacauu caucuaaacc    13800
ugcugcauau cuuaagguauu uaccacucug agcacuguau accacuagaa ggggaaugaa   13860
accuuagauc uguagaggaa aacuauuaca gaaacuccaa aaguuauaga aaauugcacc   13920
cagcauuaga uagaugguac ucuacacuaa gaaucugcua aaugaggcca ggugugguqg   13980 cuuaugccug uuaaucccag cacuuuggga ggccgaggca gauggaucgc uuagcccug    14040 gaguucgaga ugagaccagc cugaacaaca ugguqaaacc ccaucucuac aaagaaauuu   14100
```

| | | | | | |
|---|---|---|---|---|---|
| aaaaauuagc | ugggcuuagu | ggcaugcgcu | uguaguccca | gcuacuugag | gauggggug 14160 |
| cugaggagga | uaguuugagc | ccaggaaguu | gaggcugcag | ugagccuuga | uuguaccacu 14220 |
| gcacuccagc | augggcaaaa | gagccagacc | cugucugaga | aaaaaaaaa | aaaaagauua 14280 |
| aaugaaaacu | cuacaauug | ggauuggggu | gaauccaacu | aauguauuau | uacccuaaau 14340 |
| guacaguugu | acuaaaagcc | uucuaguaac | uaaagugaau | ggaaauagaa | uaccucaaug 14400 |
| aaacuggaag | aaauuacucc | aguuucauaa | gaucccucuu | gggcaguacu | uuuuagucac 14460 |
| uaguuugcu | uugggauuau | aggcugacau | uuucugauua | uuagacaguu | ugccaauaua 14520 |
| aagauugaaa | uggaagagga | uuuucauua | ucagaggacu | agucaccauu | ccucaaacaa 14580 |
| ugcaaccuuu | gaacacuuuu | gcauuuacu | uaucccaucu | cuugugccau | ucuuccuugc 14640 |
| uuuaauggau | ugugacucug | acuccaguau | acguuugau | gcaggccaac | cucauacgga 14700 |
| aaauuuucac | cauccgcauu | uacguagga | uuuuaaaaa | gauacugugg | aucagguuaa 14760 |
| aagucuucuu | cuauuccuag | uuuauaggug | uguucuguca | uuaauggaua | uugaacuuua 14820 |
| ucaaauuau | ucuuaucagu | gaugacuuac | cuguuacugu | ggugaauuac | agauauagca 14880 |
| gaguuucugg | uuuggaccac | ucuuuugcca | cucucgucac | aaugacugug | aaaacuuaau 14940 |
| uuguucaggg | gauuuaauug | uccagaaaau | aguaagcagu | uucgcugca | acuauguaac 15000 |
| aguauagga | aaacauauag | acauaauucc | auauauuagc | uagaccugau | uucaauuca 15060 |
| cuuuaaaaug | uuuucauugu | aggaaucacu | aucuucucug | uggugugc | uugggcaccu 15120 |
| cuggaugacc | ugaaagauau | ggcuucuaaa | ccgaaggagu | cucaugcuuu | cuucacaaga 15180 |
| gaguucacag | gauuagaacc | aauuguuucu | gaugucauca | gaggcauuug | uagagauuuc 15240 |
| uuagaauccc | agcaauaaug | guaacauuuu | gacaacugaa | agaaaagua | caaggggauc 15300 |
| caguguguaa | auuguauucu | cauaauacug | aaaugcuuua | gcauacuaga | aucagauaca 15360 |
| aaacuauuaa | guaugucaac | agccauuuag | gcaaauaagc | acuccuuuaa | agccgcugcc 15420 |
| uucugguuac | aauuuacagu | guacuuuguu | aaaaacacug | cugaggcuuc | auaaucaugg 15480 |
| cucuuagaaa | cucaggaaag | aggagauaau | guggauuaaa | accuuaagag | uucuaaccau 15540 |
| gccuacuaaa | uguacagaua | ugcaaauucc | uagcucaau | aaaagaaucu | gauacuaga 15600 |
| ccaaaagcaa | cauucguucu | cuaaccauuc | uguauugauu | auauaagcaa | aaugaaaaga 15660 |
| gaaacuuaaa | ugaacacagc | ucuuuaacau | gguucaggua | cacauauuuu | gacccaagug 15720 |
| gauauuucu | uaaaaccaau | caauaauagc | uagcuauuac | ugcagacuau | aaaaucugga 15780 |
| uauagaaagg | agaccuguau | caaacugcuu | uguagugug | uuucauaac | aacuuaugac 15840 |
| uaaaaauauc | acacugaaua | agagagcagg | auugccaggu | auuuucuau | uucucuccuu 15900 |
| aauuuauau | guauauagau | auauuuggcu | uauauucuaa | gucaccuaag | uacuuaaaag 15960 |
| uuaaguuggu | aaaguauuua | cugacugcuu | auaaacauuu | aaagacaaag | acauucaaa 16020 |
| uaacugcaga | aaaauauug | uaguuugaau | auuuaagcaa | uaaaacugcu | agugaguuau 16080 |
| ugu | | | | | 16083 |

<210> SEQ ID NO 2
<211> LENGTH: 16080
<212> TYPE: RNA
<213> ORGANISM: Homo sapiens

<400> SEQUENCE: 2

| | | | | | |
|---|---|---|---|---|---|
| gcggccgcgg | gggccuugcc | uuccgcacuc | gggcgcagcc | ggguggaucu | cgagcaggug 60 |
| cggagccccg | ggcggcgggc | gcggugcga | gggaucccug | acgccucugu | cccuguuucu 120 |

```
uugucgcucc cagccugucu gucgucguuu uggcgccccc gccucccgc ggugcggggu    180 ugcacaccga uccugggcuu cgcucgauuu gccgccgagg cgccucccag accuagaggg    240
gcgcuggccu ggagcagcgg gucgucugug uccucucucc ucugcgccgc gcccggggau    300
ccgaagggug cggggcucug aggaggugac gcgcggggcc ucccgcaccc uggccuugcc    360
cgcauucucc cucucuccca ggugugagca gccaucagu caccaugucc gcagccugga    420
ucccggcucu cggccucggu gggugcgcgc cccucacgac cccggcccu ugcuccgcug    480 ggugaggcu ggagccagcc cucacgcuuc ucucuucgca ggugugugc ugcugcugcu    540 gccggggccc gcgggcagcg agggagccgg ugaguggggg agcuggggug cguccaggcg    600
gucgcagggg cugagcacca gcgggacaa gcggacuca gauccagccc cuugggcuuc    660
agcccgaccg ccugaggagg aaggcgcgaa gguugagccg ccgcguggcg cgcccgcguu    720
aaccccugca gccgaucugc uccugcucac cuguuucucc caugguaggg ggccccuggg    780 guccagugggg gggacguucu ccaagagcac uaggaagaag gccuccucca ggcccaccca    840
cagccccaga ccccgggccc gcugagcgcc ggcagcagga ggucgaggaa ggaggacucc    900
uugagccuca ccgaggagcg caccagcccu gggcucugcu cgcguuuggg guggaggaga    960
agccgcccag acccgacuuc agguugccgu agccgagaga gagggaggcg aacgucgcug   1020
ucccaccuug uuugacucgc uagcuauguu ucuaggugua accccuauaa ucagaagcac   1080
ucgcggucuc acucuacacg cuagagaguu uaaaaaguuu guaccacgug uagaggugccg   1140 gguaugggug ugggguuugg uguauuuucc aguguaaaag gcaacgcuuu ccuaagagcu   1200
accguuuguu uuccuugaaa guaggaauga gguuaagua ucccucaugg cuguauuucu   1260
cccgcucuac uuaacaaaag ucaguucg caacuaaagg cggucggucu uggcaccgga   1320 uccgaugcc gccccaucu cagcggaaaa ugggaggaag gauuaaggcu guuugaugau   1380
agguaugagg cuguuaggg guaaggauuu uaaccucuca gcucucuaga cugcuucaga   1440
gcuaagaaau gggcauugcg ccugcauccu uccuucucuu ccauggaaug uaagguaccu   1500
gucaccacaa agggcacaga ggagggugcu ugucacaggc aaguacuca guuggacagu   1560 auggccagaa aguauuccuc ugccuuggaa aaaaagguu uuuaaaauua auauauguuu   1620
uaaaaagguu uggauaacua caacuuccca uguuugaaaa auagcauuua auaacauuaa   1680
ucucaauuua guaucgacag uaaauucaca auuuaacaug uuguauuaug uuaucuuguu   1740
acuuguugcc aagagcuugu ucuuuccuag caucauuuau aguaaaaacu gauucuuugu   1800
uagguugaca guguaaaacu ugagaauauu aacagcgcuu ucuaaaaaug cauccgcugc   1860
uugauaaauc ucacuggaca gaucuggagc agaaauaauc agguucaauu aagauaaaaa   1920
ugcuguauuc ugaagggauu cacuuuucug uuuucugucc uucggagguu guagaauguu   1980
guuugggcaa auuaacccca cggcuuuaau uuucucaucu auaaaugaa caaucaaguu   2040 agauaacuuu cuguguaaucu aagcaucuuu uguuggcuu ccuuaauguug ugaguuuaag   2100 gaucugcauu uguaggcuaa cuaggauaaa ugguccuaug aaggaaagga uggcuuugau   2160
uugugcacau gucuaugaaa auguuccaca aaggcucaau ccagauuuac uaucuuuacc   2220
ucaagcaacu guguacauag cgucaucaaa guugagauuu aaaaauuuuu uuuuucuuc   2280 uggagacaag aucuuauucu guaacccagg augagugca gugaugcaau cauagcucau   2340
ugcaagcuug aacucccggg cucaagcaau ccucccaccu cagccucucc aguggcgag   2400 aguacaggca ugcaccacca cgugugggcca uuuaaaaaaa auuuuuuuuu uuuagaagag   2460
```

-continued

```
augaggucuu gcuauguugu ccagacugguu cuugaccucc uggacucaag caaauccucu   2520
ugucuuggcc ugcuaaagug cugggauuau aggcaugagu caccacgccc agccaagauu   2580
uuuuauauuu cuauaauuaa auuuaaauga cuuuuauuuu cuaguucaga uauaguucca   2640
auuauguauu uccaaccugg uuaagaacug agaagccagg cacaguggca caccuguaau   2700
cccagcuacu agggaguugg aguggauuca cuugagcucg ggaauuugag ccuagcuugg   2760 gcaacuggc gagucccau uucaaaaaca aaaacgaaau aaaaacccag aacuuucaca   2820
uuagaguuuu auaguggcug gggacuauau uaaauuggaa aacaaccuug uggcuugcca   2880
aaaucuggaa ugguauggaa ggguauauaa gucaauaguc auaacuagaa guguagaaau   2940
uagggaagua aaacuuaaau cucacacugu agucucccca ccacuaugcc ccaagaaguc   3000
cuaagaaugc uuacaauauu aucuccuuuu ucuucagcuc ccauugcuau cacauguuuu   3060
accagaggcu uggacaucag gaaagagaaa gcagaugucc ucugcccagg gggcugcccu   3120
cuugaggaau ucucugugua ugggaacaua guauaugcuu cuguaucgag cauauguggg   3180
gcugcuguuc acagguaagc ccaaacacac cagggugggga gagaaaugca gacgugauua   3240
uuuccuuucc ugcuuuaccc aucuggaucc cuuccucccu gcaaucuuuc uuuuguugcc   3300
auuguggcca cagaaaaugg auauauuuuc acguucuucc uggauauacu ugaaaccacca   3360 aauacacaug gaaagcuuuc ugacaaaagg caaauagcau uaccucuuga uggcuagauu   3420
gcuaugauuc caaaacauuc cuaaucaugu gauauauuac ugaguauua cuaugugcca   3480 ccuauuguuu uaacuuccac cacaacucua caagguaggu agaauuuuac uccaguuaca   3540
gaugaagaaa cugaacucag agaguuguca aguaucuugc ccaaggugac uauuguuagc   3600
aagugccaug cuauccugua guagaauagc caguauaaua cuucuaaaaa aauucagucc   3660
aaaggcaugu agcuaaagug aguaucuuag gaaaauuguu uggugcucug aauuucuaag   3720 uugugggguaa ugggauauua caaaugaguu cuuaucaaca cuuaagaagu caacagcac   3780 aaaaccauuu uuuccaggc aaauuuugu cuuguguaag caaguuuuua aaaggcuagc   3840
agcagcuggg aguggugcu cacaccugua aucccaccac uuuggggagc uggaggcgga   3900
ggaccacuug aggucaggag uucgagaccu agccaacaug ugaaaacccu gucucuacua   3960
aaaauacaaa aauuagccag guauggguggu gcaugccugu aaucccagcu acuuggggagg   4020 cugaggcagg agaaucacuu gaaccugga gguggagguu gcagugagcc gagaucgcgc   4080
cacugcacuc cauccugggc acagagcga gacgccauca aauaaauaaa uaauaaagc   4140 agaaucuuua gaugcuuucc cugaugagcu auuucuuga uuaacaaag caauagauac   4200 aacauggcac uauaagucag ugggaugccc ugaaaaagug uggauagcau cucagcugcu   4260
auucuugugu acaggggag uaaucagcaa cucaggggaa ccuguacgag ucuauagccu   4320
accuggucga gaaaacuauu ccucaguaga ugccaauggc auccagucuc aaaugcuuuc   4380
uagauggucu gcuucuuuca caguaacuag uagguauaau uauuguucuc auucuguaau   4440
auucucccac cccccaaacg uuuucugcuu uuuuuagcuc agcccucuuua accuugaugg   4500 aaaaaccugu gaucaagacu aaagcugacc uauagaggua aacuaggu uagacugagg   4560 ggucaaguac ccacugaagc caaauuuggg ugaaugaaag acaacuuuac ugacagauga   4620
uggcaauaga aacuugaauu auuugcaguc agaaugcccg acacuuacc aaggaacuga   4680 aaacuacua aauacauuuu ugaugauccu uugaagauau aauggauaag cauuuuggu   4740 cucugaaacu agcaugcagc aggauguuug uaacuacaau caccauuacc cuauuacauu   4800
ugucauugua gagagcucua aauuagauuc auaauacuuu gguaaagaag gaaaggaaa   4860
```

-continued

```
aaaauaagcu uauuuuuauu uuaacagaag gcaaaaguag uacacaggag gccacaggac    4920
aagcaguguc cacagcacau ccaccaacag guaugaacua ugaaaccuau cuccaguug    4980 cccggcacag cauuuggaag uuaugaauaa acguguuguu gguagaagcu uuucuuaaag    5040
aaauuugaua uuaagagaa acaaagcaaa uaccuuaagu uuacugguau auuacauaug    5100
gaaacauuca uuauguguau auuuuaaaga cagggucuca cucuguugcu caggcuggag    5160
uacaguggug caaucauagc ucacugcagc cuuaaccucc uaggcucaag caaucuucuc    5220
accuuggccu ccugaguagg uguacuaca ggcacaugcc accacaccca gccaauuuuu    5280 uugauuuua auuuuuuua uuuuuauuuu uuuagacagg ucuagcuaug augcccaggc    5340
ugguuuugaa cuccugaccu caggcagucc ucccacuuca gccucccaaa guucagggau    5400
uacaggcaug agccacugca cccagccuaa uaauucucua aaguccuau uuucucccag    5460 auuugauaaa ccacgccuaa gaacuagguca aaguaccaug aacuucuagu ccauuugcu    5520 ucauuaaauu ccuuuaauua cugcacaguc augugacuaa aaggaaugug ugucuauugu    5580
aagaaauagc cagggauccc cuuuuguaug acgauggcag uuuuaaaguc aaagauauua    5640
agaacauuag gauuuaaugu ugaguuccug ccucaccugu gggguugggg uauuaaaguc    5700
cuggauuagg gcauaucaaa uauguaggcc uacauacuga uuuguuuauu uguugggucu    5760
uugcuuuccc uaguccagaa aaaccugagg aaauuaauuu uuuuaaaaaaa guccuuucaa    5820 gaauggcacu cuguuguuau gagcuucucc ccauguggggu uucuugcuau guaacugucu    5880
uccuuuuguu aaugccaagu gcaucuuuua uuucagguaa acgacuaaag aaaacacccg    5940
agaagaaaac uggcaauaaa gguaagaauc aagaucucca uuugggaagg uagcauuuuc    6000
ccucccuccu cuugagacug cuaaugaggg gacugguuug guuguucgca gauuguaaag    6060
cagacauugc auuucugauu gauggaagcu uuaauauugg gcagcgccga uuuaauuuac    6120
agaagaauuu uguuggaaaa guggcucuaa uguuggaauu ggaacagaa ggaccacaug    6180 ugggccuugu ucaagccagg uaccaaccuu guuaaaaugg gagauuuaaa aaaaaaauua    6240
uuuuguaauu gacacauaau aauuauauau acuuaugggg uacauaguga uguuuucaua    6300
cauacaaugu auagugguca aaucagagua auuagcauau ccaucaccuc aaacauugau    6360
cauuucuuug uguuggauac auucaaaauc aaaugaggcc gggugcagug gcucacgccu    6420
guaauuccag cacuuuggag gccaagugg uguguggauc accgagguc aggaguucaa    6480 aaccagucug gccaacaugu gaaacaccgu cucuacuaaa aauacaaaaa uuagccagau    6540 guggguggcau gcaccuguaa uccuagcuac uggggaggcu gaggcaggag aaucacuugg    6600
acucgggagg cagagguuac aaugagccga gauugcacca cugcacucca gccugggcaa    6660
cagugagacu augucucaaa aaaaaaaaa aaaagaaaa aaaucaaaug agaggagauu    6720
ugaaugaguc uugaaugaug acaaaugauc aguucuuuua gugguacau gucaguucag    6780 uauaaacauu ugaguuaugg acacacuggg uucccaaacu guaaguucag gaucuaagac    6840
ugccugggca gacugaguag aucugagugc cucuuuug gaauaaaaga auuagaaaa    6900 cugugugcua ucuauauaag aaccagaagg uagacuggag aguccuguug cuuacacaag    6960
ucaccucugc uuaucuacuc ugcucaauuc cuaauuucuc ucuucugaag gaagaagcag    7020
ugauaugucu auuccaccuc ccauucugu uauucuuuuu agcucuuucc auauucucuu    7080
gguuggugau cugaagcacg accuuucau uuauucauu uaaaaauauu uauuaauugc    7140
uggccaggug cgguggcuca cgccuguaau cccagcacuu ugggaggccg aggcggaugg    7200
```

```
aucacgggu  caggagauug  agaccauccu  ggcuaacacg  gggaaacccc  gucucuacua    7260 aaaaaaacaaa  aaaaaaaaau  uagccgggcg  ugguggcagg  cgccuguagu  cccagcuacu    7320
cgggaggcug  aggcaggaga  auggcgugaa  cccaggaggu  ggagcuugca  gugagccaag    7380
aucgugccac  ugcacuccag  ccugggcaac  agagcaagac  ucuguuucaa  aaaauaaaaa    7440
uaaaaauaaa  uaaauaaaua  aauauuuauu  uauuaauugc  uuuuagaaau  agaauaugcu    7500
cauuauagaa  agcuugaaaa  uacauagagc  acaaaaaaag  aaaugcucua  aaucauaugc    7560
ccuagagaua  aucacuauaa  aaugguuuuu  uuuuuuuuuu  uuuuuuuuu  uugagacgga    7620 guuuugcucu  gucaccgagg  cuggaaugca  auggcacgau  cuuguucac  acaaccucu    7680 gccuccugga  uuuaagugau  ucccugccu  cagccuccug  aguagcuggg  aucacaggug    7740
ugcacuacua  cgccuggcua  auuuuuguau  uuuuaguaga  gacaagguuu  caccauguug    7800
gccagccugg  ucucgagcuc  cugaccucag  gugauccacc  ugccucggac  ucccaaagug    7860
cuaggauuac  aggugugagc  uaccacgccu  ggccccuuca  guauuuaag  gaaauauuug    7920 acuguauuau  uuuuuaaaaa  cucagacauau  uaaaaaugcc  cugcauccug  uuuuuuucau    7980
ccuuuaguau  uuuuagcauu  uucucucucu  caaauauuca  ucaaaaauau  uucauaaauau    8040 ucugcugcau  gauuaaugucau  ucuuauauau  ucuucacuac  auuacacacu  acacuguau    8100 gaacauccuu  auaucaucuu  ugugcccauc  ucugauuauu  ucaucagguu  agauuucuaa    8160
aagugagguu  cugacuuaaa  gcccugaua  uaaauaguga  aauugagcca  ugcacagugg    8220
cucaugccug  uagugccagc  ugcucaggag  gcugaggugu  gaggaucucu  caagcccagg    8280
aguucaaagc  ugcagugagc  uaugauggca  ccacucuacu  ccagccugga  caacagaaa    8340 agaccccauc  ucuaaaaaaa  caaauaaaua  gcgaaauugc  uuccuagaaa  ggugaaguag    8400
uuuaaacuac  uaucagcagu  guguaagguu  guauaaacag  ugcuauuaca  aauauuaauu    8460
uccauuucau  uucuguuauu  uuuuacaagu  ggcucugcuc  uuagauuaga  uagaauuuu    8520 uuggcaugag  aagaaaauuu  aacguuuuua  acauaauuua  accauuuguc  ucuccccuu    8580 aaaaaaaaug  uguccuugu  ucauugacu  uaugguauca  cauuuauacc  ugaguugag    8640 caagucuauu  ucuuugauuc  auaugcuaau  ccuuacauau  uuuuucuac  gcugcuuuga    8700 uuaucacagu  uuuauugcac  auuuuaacau  cccaugaggc  aaauuccccu  gcaguacuu    8760 uugucuugua  cuuuuuucug  acuacuuuga  cccaauucuu  uuugaagaug  aauucuucau    8820 uaccuguag  acucauacaa  aguuuguag  uuuucuguu  uuagaaagac  cauuagaaua    8880
gguaaaccau  gucaaguuua  uaguauguau  agucaaagaa  cagaauauau  caaggauaca    8940
aaaaugagac  uaauuucaua  agcauaaauc  uggauaguug  aaaagugacc  acaagugaaa    9000 agguuucaa  cccaugaaau  cugauuuuau  gacccaauau  uccaucaggu  auguaugcag    9060
aaauacaguc  aguguucuac  uucucccuca  aaaaaucuug  aauaaaaugg  cuacugauaa    9120
ugcuaagauc  uuuaaauuug  cacuaggaaa  uacugacuca  ucuagaaacu  aaacacaaca    9180
gauugugcug  ugguguuuua  uacucaaaac  ggucucugcu  gaacacagag  uaguauaua    9240 aaagugagcu  gaaauuccuu  uaauauuaaa  uauaggaaau  gagaucucaa  aacucuuaca    9300
auacacauaa  uuuuaagguug  cacaaaugc  auugucauua  uaagaaaaac  ucaauauugu    9360
aacuuuauaa  uucauuucac  cuuugcccu  uuaaaaaaau  guugacgguc  acaucaauga    9420
aauuguuucu  ccugaacaga  gagcucugag  uuaauagauc  cacacuacuu  agagccucug    9480 ggucccaca  cuggaacaga  cccuagcucuc  uauccccagcc  acuccucau  uuaguuagc    9540 uaccuggugc  ccaacucugc  ggacuucugu  uaaacccgag  gcucugagcc  aagcccgauu    9600
```

-continued

```
ucaaguucuc cguauaguuu aggcauggac uuugcagcca gacaacuuga acuuaaaaug    9660
cagcuguguu ucaucaggca aacucccuaa augcucugag acucaguuuc uucauuuaca    9720
uaauugggau aauuccaacc uuauagagcu augaugaaau gagguuuuac auguguauau    9780 cuuuggcuu auuacccaga auauaauaca uccucaauau ggcauuauu uguuacaccu      9840 cugaaauauc uccaauaauu caaguaagga ugcaaugccu caguugacua uguacuaugg    9900
aauuaagaaa gaaacuugug uguugucugg uuuuaaaacu guuuuuaag gcauguaaug     9960 uugcuuauuu uaccuuuuua auucucccug aauaacauuu ucuucuucc acucagugaa    10020 caucccaaaa uagaauuuua cuugaaaaac uuuacaucag ccaaagaugu uuuguuugcc   10080
auaaaggaag uagguuucag aggggguaau uccaauacag guaaguagac uuugauaccu   10140
gggauguaac auaggagagg guuaucagug aucagacaug uaaacagua uuaugcuauu    10200 uuauaugagc agaugugaaa uccuccugga acugaaaucu uggcuagguc ugcauuugau   10260
caucugagau aaauuuucaa uuuauaaugg aaguauacca aaguuugau auuucuuauu    10320 uuaaaaaaua uaaagcaugg ugauuuagaa uucucauaca uuggauugac uagauauaac   10380
auuggagaag uaucucuuug uaaugcuaaa aagaagugaa aaucaacaga cuuaucuaau   10440
gaaugcagau guggcagaaa gaaugaguag cacuaccguu gacucugaag agagacuucu   10500
uagagguacu aaucagucac caaagggcua cauagagagc acaugcaugg aagugggaau   10560
caguuuugug uuucuaacug gcgauugaug uggggguaaac aaaugugagg cuucuaggag  10620 guggagggg aacuaauaug gcuugugaag auaaauaggc cugguagaua auuaaacuuu    10680
cccagcugau gcaucuguua cagaacuggg uucuauauaa uucuuuuuug ugugccccgc   10740
cccacugcca guucuauaua uaauucuuaa acuuugcagc aucaaaugcu acagggaaac   10800
agaaaugugg uuugagcagu gguaaaggcu auuuguuugc uucuuuuuca aauuuaggaa   10860
aagccuugaa gcauacugcu cagaaauucu ucacguaga gcuggaguaa agaaaaggga   10920
uccccaaagu ggugguggua uuuauugaug guuggccuuc ugaugacauc gaggaagcag   10980
gcauuguggc cagagaguuu ggugucaaug uauuuauagu uucuguggcc aagccuauccc  11040 cugaagaacu ggggauggu caggauguca cauuuguuga caagguaaag uggugagggu    11100
uaucuucugu uacagugaug gguauuccau uuuggaccuc uaagugcagu gcugacugcc   11160
ucuuaucuag auuaacuuga aacauucagg auuuccagu uuuaagaag aaacaacuuu     11220 ugauccuuuu ggauaucuuu uauguqucuc ccccauuagg cugucugucg gaauaauggc   11280
uucuucucuu accacaugcc caacugguuu ggcaccacaa aauacguaaa gccucuugua   11340
cagaagcugu gcagucauga acaaaugaug ugcagcaaga ccuguuauaa cucagugaac   11400
auugccuuuc uaauugaugg cuccagcagu guuggagaua gcaauuuccg ccucaugcuu   11460
gaauuuguuu ccaacauagc caagacuuuu gaaaucucgg acauuggugc caagauagcu   11520
gcuguacagu uuacuauga ucagcgcacg gaguucaguu ucacgacua agcaccaaa     11580 gagaaugucc uagcugucau cagaaacauc cgcuauauga guguggaac agcuacuggu   11640 gaugccauuu ccuucacugu uagaaaugug uuuggcccua uaaggagag ccccaacaag   11700 aacuuccuag uaauugucac agaugggcag uccuaugaug auguccaagg cccugcagcu  11760
gcugcacaug augcagguaa ggucauuguu cuuuauagga gaagggaaca gaaaaacgg    11820 uucagugaau uuaggaguaa auaaaaauuu aagcauuuau uucauuaaac aaacaccugu   11880
ggcuuuaccc aauauuaacu guuaaagcag cccuacucau cucauucuac agauaaggaa   11940
```

```
gcaaacuucc uggaaaugac auuucuagua aguggcaagg ccaagaucca aacccaggca    12000
uucuggcucc agagugcaca uuccuaacca cuguauuguu gggagaauug ccaugagaac    12060
caugucacau uaaggaaaua ugcuuauaca auauacaauua aggugcucau auuuagcuca    12120 aacuggacu auaucuccaa auagccagcu auuaaccuac caugaaucug ccauucagua     12180
auuuauccua acuucuugu guaugaaaca gguaauugcu cugucaccag gcuggagugc     12240
aguggcaugu agagcuac aaccuccaac uauuggcuc aagcaauccu ccugugucag       12300
ccuuccaaau agcuaggacg acaggcacau gccacugccc cuggcuaauu uuaaauuuu    12360 uuuggggaga acgggggguc ucacuuugu gcccaggcug aucucaaacu ccugggcuca    12420
agcgauccuc acaccuuggc cucccaaagu gcugggauua caggcauaag ccaccacacc   12480
caacccuaac uuuuauuuua gucaaguuuu gucuggcaug aguuccuaa gauaaggucu    12540 cccauagacu uuaccuaucc caucaaaauu uccuuggcca ggugcagugg cucacaucug   12600
uaauucagca cuugggagg cugagguggg cgggaucacc ugaggucagg aguucaagac    12660
cagccgggcc aacaugguaa aacccagucu cuauuaaaaa uacaaaaauu agcugggugu   12720
gguaacauac accuguaauc ccagcuacuc aggaggcuga ggcacgagaa ucacuugaac   12780
ccaggaggca gagguugcaa ugaacugaga ucgugccauu guacuccagc cugggcgaca   12840
gagugagacu cugucucaaa aagaaaaaaa aaaaaaaaaa aaaacuuuuu ccccccgcu    12900 uaagauaaua aaaacacacu cugguguauu aaagggguau aagaagggu ucuucuucc    12960 ucaccccagc cuuaauauua cuuuuggcac aggccucguu ccugaagaca uuaacguaau   13020
guguuagaga ucaauaggc caacaaaag cuaagauucc cuuucugagg auauaacuga     13080
gugacaggag ggaagaauca auggacuugu uuuuuuuaac acucuucugu accucauuuu   13140
cccuacuuaa uuccaauga cauaaccuuu uccuuucua cacauuagua ccucugccaa     13200
uguacucaca uauuuuuaca gauacugaug aaagauuauu cuuaaaacag agaacacaug   13260
caauuuaagu uccacaucua gcuuguaaaa aguauuuuuu auacaucagc aacuagccug   13320
ugaaguaaag accuguuuac uaucauauuc cuuaauacuu agcuuacuga acuuauaguu   13380
aacaggauug uauucaggcu auaaagugau uagguugauu aaaguucagg aggcuggacu   13440
acaccaauau ugauucguga aaauuauccc uuagugauau ugaaguugc aaaagccaga    13500 aaauagggua ggauuuuagg gguagaucac aacaguuuuu auuuauuuuc agggucuugc   13560
ucugucaccc aggcuggagu acaguggugu gauuauuuu uuuuuuaacu guauuauau     13620 gcugggcuug agcuaaacaa ucugaacuag aauguagaac ugaaaagaag ugaggaaaac   13680
ugagggggag gaaaaaaaua uuuugacuuu uuuuuuuuu aaccagggag ugagagucag    13740 gaaaggaga cuggaacaau uggacauugu ccaaguagc uuuuacauca ucuaaaccug     13800
cugcauaucu uagguauuua ccacucugag cacuguauac cacuagaagg ggaaugaaac   13860
cuuagaucug uagaggaaaa cuauuacaga aacuccaaaa guuauagaaa auugcaccca   13920
gcauuagaua gauggacuc uacacuaaga aucgcuaaaa ugaggccagg ugguggcu      13980 uaugccugua aucccagcac uuugggaggc cgaggcagau ggaucgcuug agcccuggag   14040
uucgagauga accagccug aacaacaugg ugaaacccca ucucuacaaa gaaauuuaaa    14100
aauuagcugg gcuuagugc augcgcuugu aguccagcu aguugaggau gggggugcug     14160
aggaggauag uuugagcccca ggaaguugag gcugcaguga gccugauug uaccacugca   14220 cuccagcaug ggcaaaagag ccagacccug ucugagaaaa aaaaaaaaaa aagauuaauu   14280
gaaaacuucu acaauuggga uuggggugaa uccaacuaau guauuauuac ccuaaaugua   14340
```

```
caguuguacu aaaagccuuc uaguaacuaa agugaaugga aauagaauac cucaaugaaa      14400
cuggaagaaa uuacuccagu ucauaagau cccucuuggg caguacuuuu uagucacuag      14460
uuuugcuuug ggauuauagg cugacauuuu cugauuauua gacaguuugc caauauaaag      14520
auugaaaugg aagaggauuu ucauuauca gaggacuagu caccauuccu caaacaaugc      14580
aaccuuugaa cacuuuugcu auuuacuuau cccaucucuu gugccauucu uccuugcuuu      14640
aauggauugu gacucugacu ccaguauacu guuugaugca ggccaaccuc auacggaaaa      14700
uuuucaccau ccgcauuuac uguaggauuu uaaaaaagau acuguggauc agguuaaaag      14760
ucuucuucua uuccuaguuu uaggugugu ucugucauua auggauauug aacuuuauca      14820
aauuauuucu uaucagugau gacuuaccug uuacuguggu gaauuacaga uauagcagag      14880
uuucugguuu ggaccacucu uuugccacuc ucgucacaau gacugugaaa acuuaauuug      14940
uucaggggau uuaauugucc agaaauuagu aagcaguuuu cgcugcaacu auguaacagu      15000
guauggaaaa cauauagaca uaauuccaua uauuagcuag accgauuuu caauucacuu      15060 uaaaauguuu ucauuguagg aaucacuauc uucucuguug guguggcuug ggcaccucug      15120
gaugaccuga aagauauggc uucuaaaccg aaggagucuc augcuuucuu cacaagagag      15180
uucacaggau uagaaccaau uguuucugau gucaucagag gcauuguag agauuucuua      15240 gaaucccagc aauaauggua acauuuugac aacugaaaga aaaaguacaa ggggauccag      15300
uguguaaauu guauucucau aauacugaaa ugcuuuagca uacagaaauc agauacaaaa      15360
cuauuaagua ugucaacagc cauuuaggca aauaagcacu ccuuuaaagc cgcugccuuc      15420
ugguuacaau uuacagugua cuuuguuaaa aacacugcug aggcuucaua aucauggcuc      15480
uuagaaacuc aggaaagagg agauaauguug gauuaaaacc uuaagaguuc uaaccaugcc      15540
uacuaaaugu acagauaugc aaauuccaua gcucaauaaa agaaucugau acuuagacca      15600
aaagcaacau ucguucucua accauucugu auugauuaua uaagcaaaau gaaaagagaa      15660
acuuaaauga acacagcucu uuaacauggu ucagguacac auauuuugac ccaaguggau      15720
auuuucuuaa aaccaaucaa uaauagcuag cuauuacugc agacauauaaa aucuggauau      15780 agaaaggaga ccuguaucaa acugcuuuug uagugugiuu ucauaacaac uuaugacuaa      15840
aaauaucaca cugaauaaga gagcaggauu gccagguauu uuucauuuc ucuccuuaau      15900 uuuauaugua uauagauaua uuuggcuuau auucuaaguc accaaguac uuaaaaguua      15960 aguugguaaa guauuuacug acugcuuaua aacauuuaaa gacaaagaca uuucaaauaa      16020
cugcagaaaa aauauuguag uuugaauauu uaagcaauaa aacugcuagu gaguuauugu      16080
```

<210> SEQ ID NO 3
<211> LENGTH: 61
<212> TYPE: DNA
<213> ORGANISM: Homo sapiens

<400> SEQUENCE: 3

```
atcaggaaag agaaagcaga tgtcctctgc tcaggggct gccctcttga ggaattctct      60
g                                                                    61
```

<210> SEQ ID NO 4
<211> LENGTH: 51
<212> TYPE: DNA
<213> ORGANISM: Homo sapiens

<400> SEQUENCE: 4

```
gaaagagaaa gcagatgtcc tctgctcagg gggctgccct cttgaggaat t          51
```

<210> SEQ ID NO 5
<211> LENGTH: 41
<212> TYPE: DNA
<213> ORGANISM: Homo sapiens

<400> SEQUENCE: 5

```
agaaagcaga tgtcctctgc tcagggggct gccctcttga g                     41
```

<210> SEQ ID NO 6
<211> LENGTH: 62
<212> TYPE: DNA
<213> ORGANISM: Homo sapiens

<400> SEQUENCE: 6

```
aatttttttt attttttattt ttttagacag aggtctagct atgatgccca ggctggtttt  60
ga                                                                 62
```

<210> SEQ ID NO 7
<211> LENGTH: 52
<212> TYPE: DNA
<213> ORGANISM: Homo sapiens

<400> SEQUENCE: 7

```
ttttatttt tatttttta gacagaggtc tagctatgat gcccaggctg gt            52
```

<210> SEQ ID NO 8
<211> LENGTH: 42
<212> TYPE: DNA
<213> ORGANISM: Homo sapiens

<400> SEQUENCE: 8

```
atttttattt ttagacag aggtctagct atgatgccca gg                      42
```

<210> SEQ ID NO 9
<211> LENGTH: 62
<212> TYPE: DNA
<213> ORGANISM: Homo sapiens

<400> SEQUENCE: 9

```
ctattaaaaa tgccctgcat cctgtttttt tatcctttag tattttagc attttctctc   60 tc                                                                62
```

<210> SEQ ID NO 10
<211> LENGTH: 52
<212> TYPE: DNA
<213> ORGANISM: Homo sapiens

<400> SEQUENCE: 10

```
aaaaatgccc tgcatcctgt tttttatcc tttagtattt ttagcatttt ct           52
```

<210> SEQ ID NO 11
<211> LENGTH: 42
<212> TYPE: DNA
<213> ORGANISM: Homo sapiens

<400> SEQUENCE: 11

```
tgccctgcat cctgtttttt tatcctttag tattttagc at                     42
```

<210> SEQ ID NO 12
<211> LENGTH: 66

```
<212> TYPE: DNA
<213> ORGANISM: Homo sapiens

<400> SEQUENCE: 12
ttttatcctt tagtattttt agcattttct ctctctcaaa tattcatcaa aaatatttca    60
tatcat                                                               66

<210> SEQ ID NO 13
<211> LENGTH: 56
<212> TYPE: DNA
<213> ORGANISM: Homo sapiens

<400> SEQUENCE: 13
tcctttagta tttttagcat tttctctctc tcaaatattc atcaaaaata tttcat        56

<210> SEQ ID NO 14
<211> LENGTH: 46
<212> TYPE: DNA
<213> ORGANISM: Homo sapiens

<400> SEQUENCE: 14
tagtattttt agcattttct ctctctcaaa tattcatcaa aaatat                   46

<210> SEQ ID NO 15
<211> LENGTH: 61
<212> TYPE: DNA
<213> ORGANISM: Homo sapiens

<400> SEQUENCE: 15
tgcttttggc ttattaccca gaatataata catcctcaat atggcaatta tttgttacac    60
c                                                                    61

<210> SEQ ID NO 16
<211> LENGTH: 51
<212> TYPE: DNA
<213> ORGANISM: Homo sapiens

<400> SEQUENCE: 16
ttggcttatt acccagaata taatacatcc tcaatatggc aattatttgt t             51

<210> SEQ ID NO 17
<211> LENGTH: 41
<212> TYPE: DNA
<213> ORGANISM: Homo sapiens

<400> SEQUENCE: 17
ttattaccca gaatataata catcctcaat atggcaatta t                        41

<210> SEQ ID NO 18
<211> LENGTH: 61
<212> TYPE: DNA
<213> ORGANISM: Homo sapiens

<400> SEQUENCE: 18
agggctacat agagagcaca tgcatggaag ggggaatcag ttttgtgttt ctaactggcg    60
a                                                                    61

<210> SEQ ID NO 19
<211> LENGTH: 51
<212> TYPE: DNA
<213> ORGANISM: Homo sapiens
```

<400> SEQUENCE: 19
tacatagaga gcacatgcat ggaagggga atcagttttg tgtttctaac t       51

<210> SEQ ID NO 20
<211> LENGTH: 41
<212> TYPE: DNA
<213> ORGANISM: Homo sapiens

<400> SEQUENCE: 20
agagagcaca tgcatggaag ggggaatcag ttttgtgttt c                 41

<210> SEQ ID NO 21
<211> LENGTH: 61
<212> TYPE: DNA
<213> ORGANISM: Homo sapiens

<400> SEQUENCE: 21
gcagctgctg cacatgatgc aggtaaggtc attgttcttt ataggagaag ggaacagaaa    60
a                                                             61

<210> SEQ ID NO 22
<211> LENGTH: 51
<212> TYPE: DNA
<213> ORGANISM: Homo sapiens

<400> SEQUENCE: 22
tgctgcacat gatgcaggta aggtcattgt tctttatagg agaagggaac a       51

<210> SEQ ID NO 23
<211> LENGTH: 41
<212> TYPE: DNA
<213> ORGANISM: Homo sapiens

<400> SEQUENCE: 23
cacatgatgc aggtaaggtc attgttcttt ataggagaag g                 41

<210> SEQ ID NO 24
<211> LENGTH: 61
<212> TYPE: DNA
<213> ORGANISM: Homo sapiens

<400> SEQUENCE: 24
gttacagggg agtaatcagc aactcagggg aacctgtacg agtctatagc ctacctggtc    60
g                                                             61

<210> SEQ ID NO 25
<211> LENGTH: 51
<212> TYPE: DNA
<213> ORGANISM: Homo sapiens

<400> SEQUENCE: 25
aggggagtaa tcagcaactc agggggaacct gtacgagtct atagcctacc t       51

<210> SEQ ID NO 26
<211> LENGTH: 41
<212> TYPE: DNA
<213> ORGANISM: Homo sapiens

<400> SEQUENCE: 26
agtaatcagc aactcagggg aacctgtacg agtctatagc c                 41

```
<210> SEQ ID NO 27
<211> LENGTH: 20
<212> TYPE: DNA
<213> ORGANISM: Artificial Sequence
<220> FEATURE:
<223> OTHER INFORMATION: AON_X1a

<400> SEQUENCE: 27
ccugagcaga ggacatcugc                                                   20

<210> SEQ ID NO 28
<211> LENGTH: 20
<212> TYPE: DNA
<213> ORGANISM: Artificial Sequence
<220> FEATURE:
<223> OTHER INFORMATION: AON_X1b

<400> SEQUENCE: 28
ccctgagcag aggacatctg                                                   20

<210> SEQ ID NO 29
<211> LENGTH: 20
<212> TYPE: DNA
<213> ORGANISM: Artificial Sequence
<220> FEATURE:
<223> OTHER INFORMATION: AON_X1c

<400> SEQUENCE: 29
cccctgagca gaggacaucu                                                   20

<210> SEQ ID NO 30
<211> LENGTH: 20
<212> TYPE: DNA
<213> ORGANISM: Artificial Sequence
<220> FEATURE:
<223> OTHER INFORMATION: AON_X1d

<400> SEQUENCE: 30
tgagcagagg acatctgctt                                                   20

<210> SEQ ID NO 31
<211> LENGTH: 20
<212> TYPE: DNA
<213> ORGANISM: Artificial Sequence
<220> FEATURE:
<223> OTHER INFORMATION: AON_X1e

<400> SEQUENCE: 31 agcccctga gcagaggaca                                                    20

<210> SEQ ID NO 32
<211> LENGTH: 20
<212> TYPE: DNA
<213> ORGANISM: Artificial Sequence
<220> FEATURE:
<223> OTHER INFORMATION: AON_X1f

<400> SEQUENCE: 32 gcagcccct gagcagagga                                                    20

<210> SEQ ID NO 33
<211> LENGTH: 20
<212> TYPE: DNA
<213> ORGANISM: Artificial Sequence
<220> FEATURE:
<223> OTHER INFORMATION: AON_X1g
```

```
<400> SEQUENCE: 33
ctgagcagag gacatctgct                                              20

<210> SEQ ID NO 34
<211> LENGTH: 20
<212> TYPE: DNA
<213> ORGANISM: Artificial Sequence
<220> FEATURE:
<223> OTHER INFORMATION: AON_X1h

<400> SEQUENCE: 34
ccctgagcag aggacatctg                                              20

<210> SEQ ID NO 35
<211> LENGTH: 20
<212> TYPE: DNA
<213> ORGANISM: Artificial Sequence
<220> FEATURE:
<223> OTHER INFORMATION: AON X3a

<400> SEQUENCE: 35
atagctagac ctctgtctaa                                              20

<210> SEQ ID NO 36
<211> LENGTH: 19
<212> TYPE: DNA
<213> ORGANISM: Artificial Sequence
<220> FEATURE:
<223> OTHER INFORMATION: primer

<400> SEQUENCE: 36
gaagttcggt tctcaggcc                                               19

<210> SEQ ID NO 37
<211> LENGTH: 20
<212> TYPE: DNA
<213> ORGANISM: Artificial Sequence
<220> FEATURE:
<223> OTHER INFORMATION: primer

<400> SEQUENCE: 37
tgccatcgtc atacaaaagg                                              20

<210> SEQ ID NO 38
<211> LENGTH: 23
<212> TYPE: DNA
<213> ORGANISM: Artificial Sequence
<220> FEATURE:
<223> OTHER INFORMATION: primer

<400> SEQUENCE: 38
caaaatctgg aatggtatgg aag                                          23

<210> SEQ ID NO 39
<211> LENGTH: 20
<212> TYPE: DNA
<213> ORGANISM: Artificial Sequence
<220> FEATURE:
<223> OTHER INFORMATION: primer

<400> SEQUENCE: 39
gatcaaatgc agacctagcc                                              20

<210> SEQ ID NO 40
<211> LENGTH: 21
```

```
<212> TYPE: DNA
<213> ORGANISM: Artificial Sequence
<220> FEATURE:
<223> OTHER INFORMATION: primer

<400> SEQUENCE: 40
tcccctgcag tacttttgt c                                          21

<210> SEQ ID NO 41
<211> LENGTH: 22
<212> TYPE: DNA
<213> ORGANISM: Artificial Sequence
<220> FEATURE:
<223> OTHER INFORMATION: primer

<400> SEQUENCE: 41
gtaagccagc ttacaataac tc                                        22

<210> SEQ ID NO 42
<211> LENGTH: 18
<212> TYPE: DNA
<213> ORGANISM: Artificial Sequence
<220> FEATURE:
<223> OTHER INFORMATION: primer

<400> SEQUENCE: 42
atgtccgcag cctggatc                                             18

<210> SEQ ID NO 43
<211> LENGTH: 19
<212> TYPE: DNA
<213> ORGANISM: Artificial Sequence
<220> FEATURE:
<223> OTHER INFORMATION: primer

<400> SEQUENCE: 43
ggcttgaaca aggcccaca                                            19

<210> SEQ ID NO 44
<211> LENGTH: 25
<212> TYPE: DNA
<213> ORGANISM: Artificial Sequence
<220> FEATURE:
<223> OTHER INFORMATION: primer

<400> SEQUENCE: 44
ggacatcagg aaagagaaag cagat                                     25

<210> SEQ ID NO 45
<211> LENGTH: 26
<212> TYPE: DNA
<213> ORGANISM: Artificial Sequence
<220> FEATURE:
<223> OTHER INFORMATION: primer

<400> SEQUENCE: 45
cccatacaca gagaattcct caagag                                    26

<210> SEQ ID NO 46
<211> LENGTH: 14
<212> TYPE: DNA
<213> ORGANISM: Artificial Sequence
<220> FEATURE:
<223> OTHER INFORMATION: primer

<400> SEQUENCE: 46
```

```
cccccctgggc agag                                                  14

<210> SEQ ID NO 47
<211> LENGTH: 14
<212> TYPE: DNA
<213> ORGANISM: Artificial Sequence
<220> FEATURE:
<223> OTHER INFORMATION: primer

<400> SEQUENCE: 47 cccccctgagc agag                                                  14

<210> SEQ ID NO 48
<211> LENGTH: 20
<212> TYPE: DNA
<213> ORGANISM: Artificial Sequence
<220> FEATURE:
<223> OTHER INFORMATION: primer

<400> SEQUENCE: 48
atacagccag gtcctagcca                                             20

<210> SEQ ID NO 49
<211> LENGTH: 20
<212> TYPE: DNA
<213> ORGANISM: Artificial Sequence
<220> FEATURE:
<223> OTHER INFORMATION: primer

<400> SEQUENCE: 49
aagtgacgca gccctctatg                                             20

<210> SEQ ID NO 50
<211> LENGTH: 20
<212> TYPE: DNA
<213> ORGANISM: Artificial Sequence
<220> FEATURE:
<223> OTHER INFORMATION: AON X4a

<400> SEQUENCE: 50
auagactcgt acagguuccc                                             20

<210> SEQ ID NO 51
<211> LENGTH: 21
<212> TYPE: DNA
<213> ORGANISM: Artificial Sequence
<220> FEATURE:
<223> OTHER INFORMATION: primer

<400> SEQUENCE: 51
tcacagatgg gcagtcctat g                                           21

<210> SEQ ID NO 52
<211> LENGTH: 21
<212> TYPE: DNA
<213> ORGANISM: Artificial Sequence
<220> FEATURE:
<223> OTHER INFORMATION: primer

<400> SEQUENCE: 52
actccttcgg tttagaagcc a                                           21

<210> SEQ ID NO 53
<211> LENGTH: 20
<212> TYPE: DNA
<213> ORGANISM: Artificial Sequence
```

```
<220> FEATURE:
<223> OTHER INFORMATION: AONX3b

<400> SEQUENCE: 53
ucauagcuag accucugucu                                                    20

<210> SEQ ID NO 54
<211> LENGTH: 20
<212> TYPE: DNA
<213> ORGANISM: Artificial Sequence
<220> FEATURE:
<223> OTHER INFORMATION: AON X3d

<400> SEQUENCE: 54
aucatagcta gaccucuguc                                                    20

<210> SEQ ID NO 55
<211> LENGTH: 20
<212> TYPE: DNA
<213> ORGANISM: Artificial Sequence
<220> FEATURE:
<223> OTHER INFORMATION: AON X3d

<400> SEQUENCE: 55
caucatagct agaccucugu                                                    20

<210> SEQ ID NO 56
<211> LENGTH: 20
<212> TYPE: DNA
<213> ORGANISM: Artificial Sequence
<220> FEATURE:
<223> OTHER INFORMATION: AON X3e

<400> SEQUENCE: 56
agctagaccu ctgtctaaaa                                                    20

<210> SEQ ID NO 57
<211> LENGTH: 20
<212> TYPE: DNA
<213> ORGANISM: Artificial Sequence
<220> FEATURE:
<223> OTHER INFORMATION: AON X3f

<400> SEQUENCE: 57
uagctagacc tctgtcuaaa                                                    20
```